(12) United States Patent
Kinoshita et al.

(10) Patent No.: US 10,582,249 B2
(45) Date of Patent: Mar. 3, 2020

(54) COOKING CONTROL DEVICE, COOKING CONTROL SYSTEM, AND COOKING CONTROL METHOD

(71) Applicant: Panasonic Intellectual Property Management Co., Ltd., Osaka (JP)

(72) Inventors: Satoshi Kinoshita, Osaka (JP); Masaharu Matsumoto, Osaka (JP); Tsutomu Uenoyama, Osaka (JP); Takuya Tanaka, Osaka (JP); Yuta Hachiri, Osaka (JP); Yumiko Nakayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/157,441

(22) Filed: Oct. 11, 2018

(65) Prior Publication Data

US 2019/0116394 A1   Apr. 18, 2019

Related U.S. Application Data

(60) Provisional application No. 62/571,800, filed on Oct. 13, 2017.

(51) Int. Cl.
*H04N 21/414* (2011.01)
*A23L 5/10* (2016.01)
(Continued)

(52) U.S. Cl.
CPC ......... *H04N 21/41422* (2013.01); *A23L 5/10* (2016.08); *H04N 21/4131* (2013.01); *H04N 21/8456* (2013.01)

(58) Field of Classification Search
CPC ......... H04N 21/41422; H04N 21/8456; H04N 21/4131; A23L 5/10; H05B 1/0236; B64D 11/04; B64D 11/0015; B64D 11/0007

See application file for complete search history.

(56) References Cited

U.S. PATENT DOCUMENTS

| | | | |
|---|---|---|---|
| 6,177,887 B1 | 1/2001 | Jerome | |
| 2001/0036203 A1* | 11/2001 | Yamaguchi | ............ H04H 20/28 370/535 |

(Continued)

FOREIGN PATENT DOCUMENTS

| | | |
|---|---|---|
| JP | 2001-333030 | 11/2001 |
| JP | 2006-5821 | 1/2006 |

(Continued)

OTHER PUBLICATIONS

Extended European Search Report dated Feb. 20, 2019 in corresponding European Patent Application No. 18200128.9.

*Primary Examiner* — Fernando Alcon
(74) *Attorney, Agent, or Firm* — Wenderoth, Lind & Ponack, L.L.P.

(57) ABSTRACT

The cooking control device is installed on a moving object and is configured to communicably connect to a plurality of content display devices and one or more cooking apparatuses, each of the content display devices configured to playback content on a screen. The cooking control device comprises a processor and a transmitter. The processor receives content playback information for the plurality of content display devices respectively, determines one or more of the plurality of content display devices that finish playback of content within a given time based on the content playback information, and produces a preparation/cooking instruction for the one or more cooking apparatuses according to a number of the one or more of the plurality of content (Continued)

display devices. The transmitter transmits the preparation/cooking instruction to the one or more cooking apparatuses.

15 Claims, 15 Drawing Sheets

(51) Int. Cl.
*H04N 21/41* (2011.01)
*H04N 21/845* (2011.01)

(56) References Cited

U.S. PATENT DOCUMENTS

| | | | | |
|---|---|---|---|---|
| 2002/0135739 | A1* | 9/2002 | Standard | E04H 3/22 353/46 |
| 2005/0281542 | A1 | 12/2005 | Toya | |
| 2008/0219639 | A1* | 9/2008 | Terashima | H04N 5/765 386/343 |
| 2009/0288123 | A1 | 11/2009 | Havlovick et al. | |
| 2013/0248652 | A1 | 9/2013 | Godecker et al. | |
| 2015/0294225 | A1 | 10/2015 | Takei et al. | |
| 2016/0083091 | A1* | 3/2016 | Elias | B64D 11/0015 455/3.06 |
| 2017/0013224 | A1* | 1/2017 | Heo | G08C 17/02 |

FOREIGN PATENT DOCUMENTS

| | | |
|---|---|---|
| JP | 2013-58069 | 3/2013 |
| JP | 2015-206585 | 11/2015 |

* cited by examiner

FIG. 3
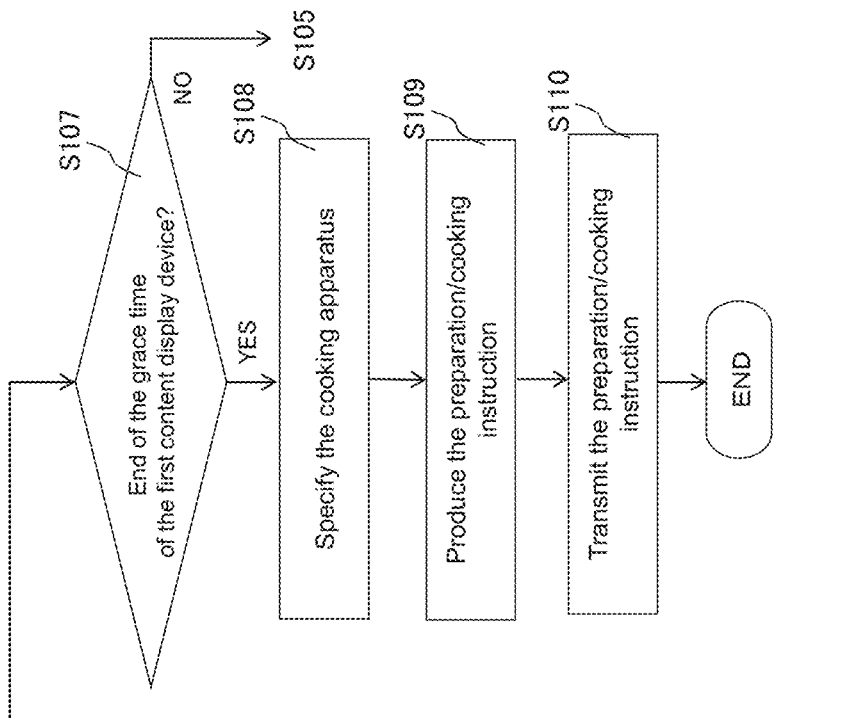
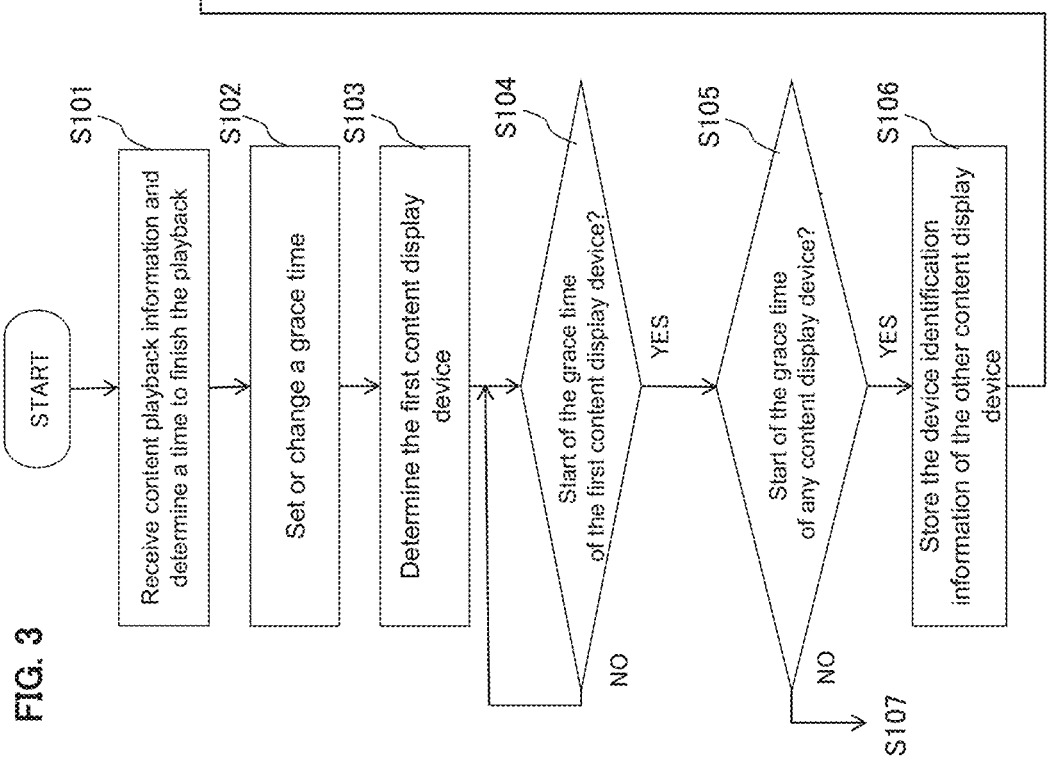

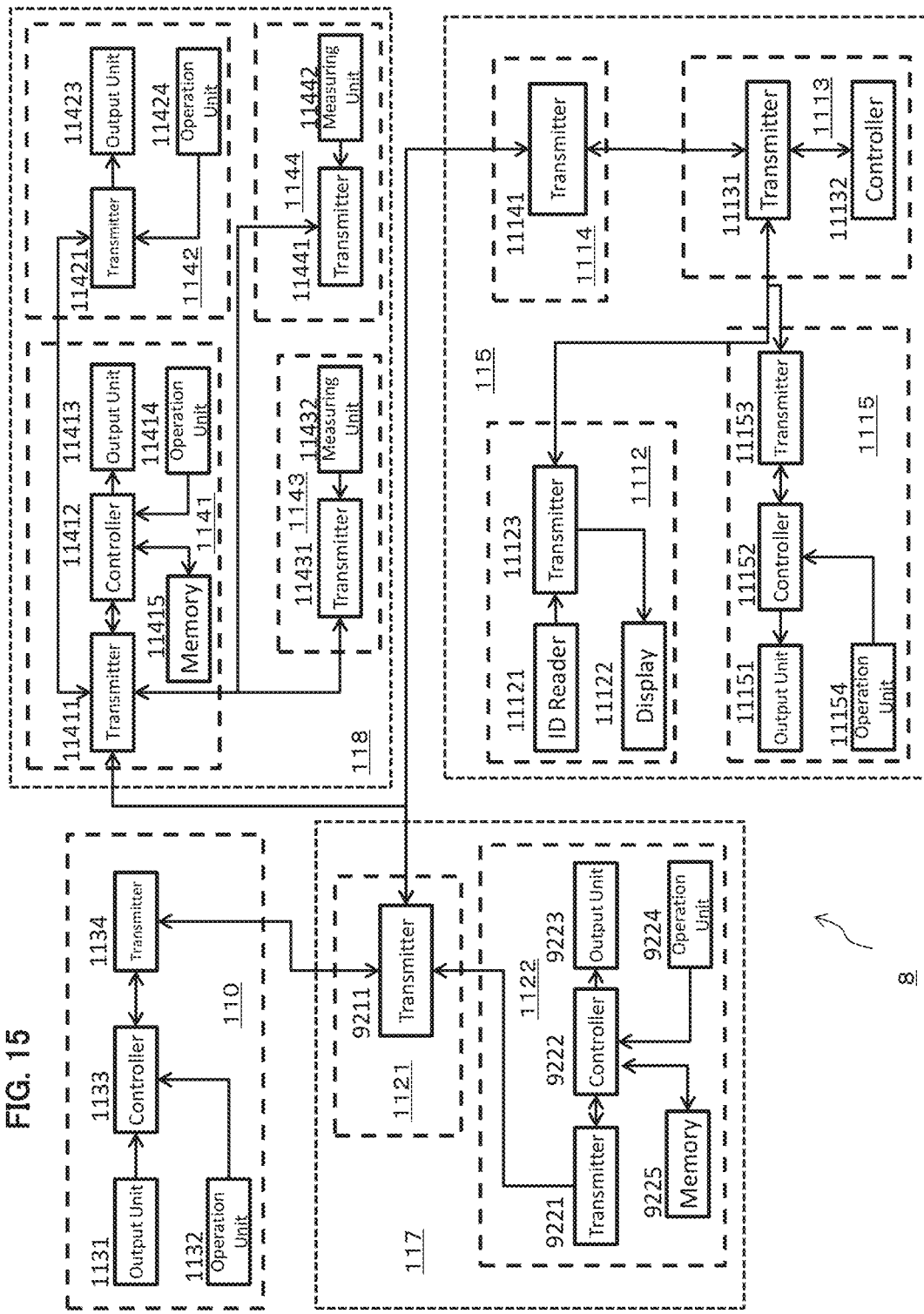

COOKING CONTROL DEVICE, COOKING CONTROL SYSTEM, AND COOKING CONTROL METHOD

CROSS-REFERENCE TO RELATED APPLICATION

This application claims benefit to U.S. provisional application No. 62/571,800, filed on Oct. 13, 2017. The entire disclosure of U.S. provisional application 62/571,800 is hereby incorporated herein by reference.

BACKGROUND

Technical Field

The present disclosure relates to a cooking control device for controlling a cooking apparatus used in a moving object such as an aircraft, a cooking control system and a cooking control method using the device.

Background Art

With the growth of the Internet in recent years, the IoT (Internet of Things) has been rapidly evolving in which not only personal computers and mobile phones but also home electric appliances such as refrigerators are connected to the network.

Moving objects such as aircrafts and long-distance trains are equipped with cooking apparatuses such as ovens and coffeemakers, wherein crew members operate the cooking apparatuses to prepare and provide food and beverages for passengers.

The crew members, however, are required to perform many more tasks in addition to preparing food and beverages, such as waiting on passengers, cleaning, and selling goods. In some situations, the crew members are not able to stay still, for frequently having to go to where the cooking apparatuses are located in the moving object (such as galleys on an aircraft) in order to prepare food and beverages. A galley as referred to herein means a place where food and beverages are prepared in a moving object such as an aircraft and a ship.

SUMMARY

The present disclosure, therefore, relates to a cooking control device and a cooking control system that are installed on a moving object such as an aircraft, and a cooking control method using such device or system.

The cooking control device is installed on a moving object and is configured to communicably connect to a plurality of content display devices and one or more cooking apparatuses, each of the plurality of content display devices configured to playback content on a screen. The cooking control device comprises a processor and a transmitter. The processor receives content playback information for the plurality of content display devices respectively, determines one or more of the plurality of content display devices that finish playback of content within a given time based on the content playback information, and produces a preparation/cooking instruction for the one or more cooking apparatuses according to a number of the one or more of the plurality of content display devices. The transmitter transmits the preparation/cooking instruction to the one or more cooking apparatuses.

To "finish playback of content" as referred to herein includes at least one of: completion of playback of the whole content or stopping playback of content at a scene change before completion of playback of the whole content.

BRIEF DESCRIPTION OF DRAWINGS

FIG. 3 shows a flowchart illustrating an operation performed by a server according to Embodiment 1;
FIG. 15 shows the whole configuration of a system according to Embodiment 8.

DETAILED DESCRIPTION

Embodiments of the present disclosure are now described hereinafter with reference to the drawings as appropriate. In particular, the following description takes a commercial aircraft as an example of the moving object.

In a computer device or a computer terminal in the following description, the controller includes a processor (electronic circuit) such as a CPU and a memory such as a RAM or a ROM that stores programs executed by the processor and parameters. The storage may be a magnetic storage device such as an HDD, a semiconductor storage device, an optical storage device, a magneto-optical storage device, or the like. Note that the storage may be independently provided as a storage device.

Embodiment 1

For the purpose of reducing the boredom of passengers, in traveling long distance by aircraft for a long time, each of the passenger seats in the cabin is equipped with an in-flight entertainment device for providing in-flight entertainments (movies, dramas, music, etc.).

For example, when a passenger is focused on a movie, the passenger may not be aware of his/her hunger or thirst or may feel annoyed about his/her viewing being interrupted by a food/beverage service.

The passenger, therefore, often orders food or a beverage (e.g., hot coffee) to quench his/her thirst after the content such as a movie ends. Specifically, a crew member responds to a call from the passenger who is finished with the content, goes to the seat of the passenger to take an order for food/beverage, operates a cooking apparatus at a galley to prepare the food/beverage, and then carries the prepared food/beverage to the seat of the passenger; a large amount of workload is involved. On the other hand, it takes a lot of time and trouble for the passenger to receive the prepared food/beverage since finishing viewing/listening of the content; the passenger might not be able to enjoy the food/beverage when he/she desires.

A cooking control device, a cooking control system and a cooking control method according to this embodiment automatically controls a cooking apparatus so that a crew member can efficiently provide food/beverage to a number of passengers when the passengers are finished with the content or when they have a break.

1-1

1-1-1. Cooking Control System

Figure 1:
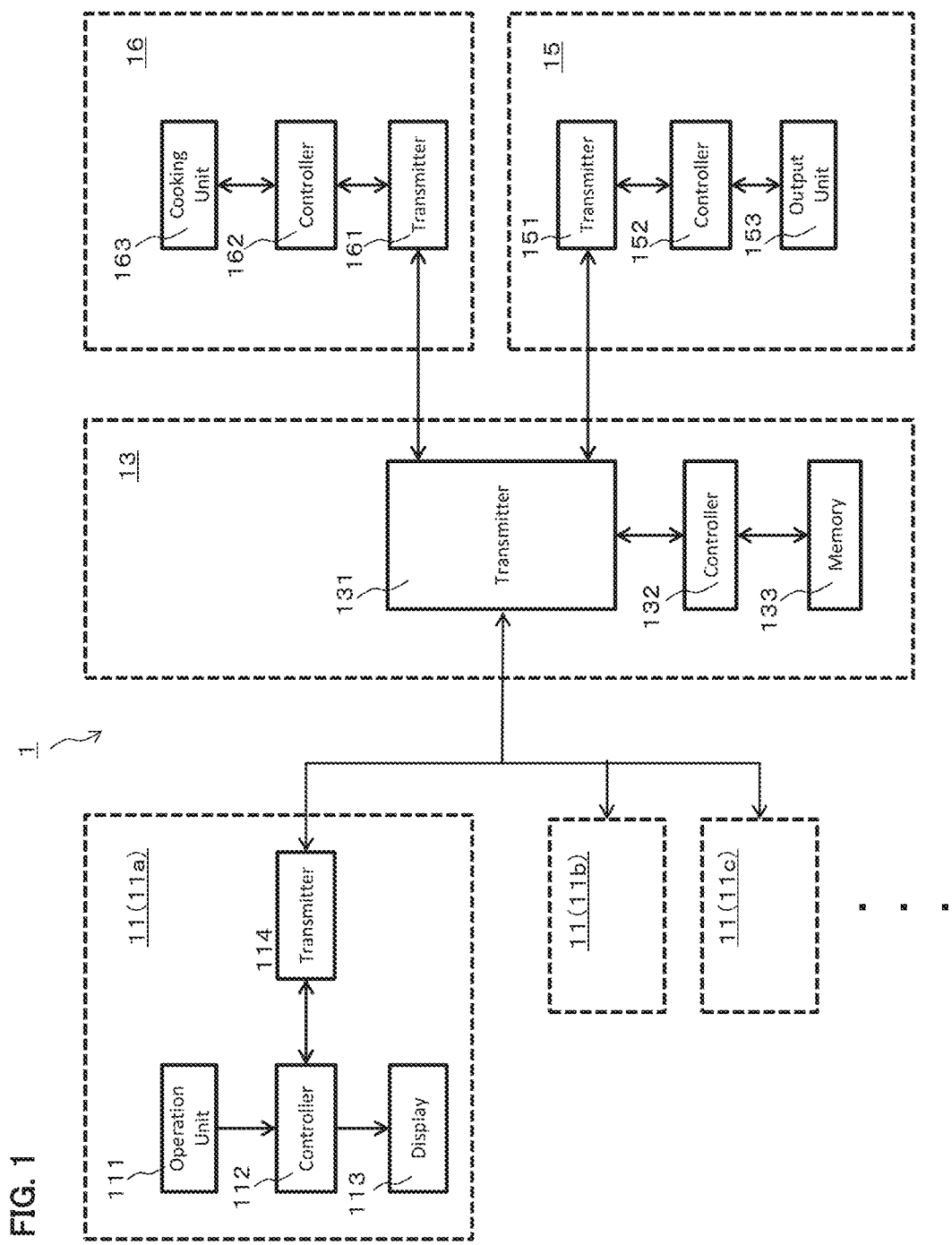
FIG. 1 shows the whole configuration of a system according to Embodiment 1.

As shown in FIG. 1, the cooking control system 1 according to this embodiment is installed in an aircraft and includes a plurality of content display devices 11, a server 13, a cooking apparatus 16, and a mobile terminal 15. The plurality of content display devices 11, the cooking apparatus 16, and the mobile terminal 15 are connected to the server 13 so as to be capable of wired or wireless communication.

1-1-2. Content Display Device

Each of the plurality of content display devices 11 (11 a, 11 b, 11 c . . . ) is, for example, a sheet monitor or a touch panel type terminal installed for each seat in the aircraft. Each content display device 11 executes playback and stop of content selected from the in-flight entertainment (movies or dramas) distributed from the server 13, and outputs the selected content. Each content display device 11 is a computer device and includes an operation unit 111, a controller 112, a display 113, and a transmitter 114.

The operation unit 111 receives an operation input by a passenger. For example, upon receipt of an input instructing to playback a movie displayed on the display 113, the operation unit 111 instructs the control unit 112 to start playback of the movie. The operation unit 111 may be a physical button or electrostatic capacitance-type or pressure-sensitive-type coordinate input means used in a touch panel.

The controller 112 controls the overall operation of the content display device 11. Specifically, the controller 112 receives an input from the operation unit 111 for instructing playback of content. Then, the controller 112 transmits device identification information (e.g., seat 20A) for identifying the content display device 11, content identification information indicating the content selected through the operation unit 111, and information indicating the playback instruction, to the server 13 via the communication unit 114.

The display 113 is a display that serves to display information required for operations used in the operation unit 111 and to display information, such as a movie, which is transmitted from the server 13 in response to the playback instruction that is input by the operation unit 111 and transmitted to the server 13.

The communication unit 114 is connected to the server 13 via an in-flight network (which may be either wired or wireless), and sends and receives various kinds of information such as content playback information and message from a crew member.

1-1-3. Cooking Apparatus

The cooking apparatus 16 can be a coffee maker, a microwave oven, an oven, a rice cooker, or the like. The following description takes a coffee maker as an example. The cooking apparatus 16 includes a transmitter 161, a controller 162 including a processor and a memory, and a cooking unit 163.

The transmitter 161 is connected to the in-flight network, receives a preparation/cooking instruction from the server 13 as described later, and transmits the preparation/cooking instruction to the controller 162. The transmitter 161 also notifies the server 13 of a preparation or cooking status such as completion of preparation or cooking after the preparation or cooking is executed according to the preparation/cooking instruction.

The controller 162 includes a processor. The controller 162 sets an extraction amount of coffee as an amount of preparation or cooking, for the cooking unit 163, and gives an instruction to start the preparation or cooking. Upon detecting completion of preparation or cooking by the cooking unit 163, the controller 162 may transmit information indicating the completion of preparation or cooking to the mobile terminal 15 via the server 13. Additionally, if no food/beverages have been provided to passengers for a certain period of time after completion of preparation or cooking, the controller 162 may transmit such information to the mobile terminal 15 of a crew member.

The cooking unit 163 includes heating means for performing preparation or cooking and other mechanisms. In the case of a coffee maker, the cooking unit 163 performs processes such as feeding water, heating, bean grinding, dripping and the like according to the set extraction amount.

1-1-4. Mobile Terminal

The mobile terminal 15 is, for example, a smartphone, a tablet, or a wearable terminal, which is carried and held by the crew member at work. The mobile terminal 15 is a computer terminal including a transmitter 151, a controller 152, and an output unit 153.

The transmitter 151 is connected to the in-flight network and receives, from the server 13, the device identification information (e.g., seat 20A) of the content display device 11, the content finishing time, the preparation/cooking progress information on the cooking apparatus 16 (indicating whether food/beverage preparation is in progress or completed), and the location information on the cooking apparatus 16 (e.g., the rear of the aircraft) that has completed the food/beverage preparation.

The controller 152 converts a format of each kind of information received by the transmitter 151 into an outputable format, and transmits the resultant information to the output unit 153. The output unit 153 is a display, a speaker, or a vibrator, and serves to output the receipt of the information through display or using a sound or vibration. The output unit 153 may also serve to output such details as the device identification information of the content display device 11 (e.g., seat 20A), the content finishing time, the preparation progress information on the cooking apparatus 16 (indicating whether food/beverage preparation is in progress or completed), and the location information on the cooking apparatus 16 (e.g., the rear of the aircraft) that has completed the food/beverage preparation.

Such configuration allows the crew member to recognize that the content enjoyed by the passenger in seat 20A, such as a movie, is about to finish, so that the crew member can start carrying coffee or prepare for an in-flight meal service.

1-1-5. Server

The server 13 is an example of the cooking control device, which is a computer device including a controller 132, a transmitter 131, and a memory 133.

The controller 132 includes a processor, and executes data calculation and control by executing a program. Specifically, the controller 132 performs the cooking control method, which will be described later.

The transmitter 131 is connected to the in-flight network, receives information and instructions from the plurality of content display devices 11 at regular intervals, and transmits the received information and instructions to the controller 132. The transmitter 131 also transmits to the cooking apparatus 16 or the mobile terminal 15 the preparation/cooking instruction and any other information produced by the controller 132.

The memory 133 stores content distributed to the content display devices 11 such as movies, dramas, and music in association with content playback information (e.g., playback time, chapter information, etc.). The content playback information is information with which the controller 132 can determine a time to finish the playback of content. Such information may include, for example, a playback position of the content, a playback stop position of the content, a remaining time length of the playback of the content, and a time to finish the playback of the content.

In response to the content identification information received from the content display device 11, the controller 132 extracts the relevant content from among the content stored in the memory 133, and transmits the extracted content to the content display device 11 via the transmitter 131. The controller 132 determines on which seat content display device 11 is playbacking content, what the content is, and how long it will take to finish the playback of the content, based on the current content playback position and the content playback information.

Figure 2:
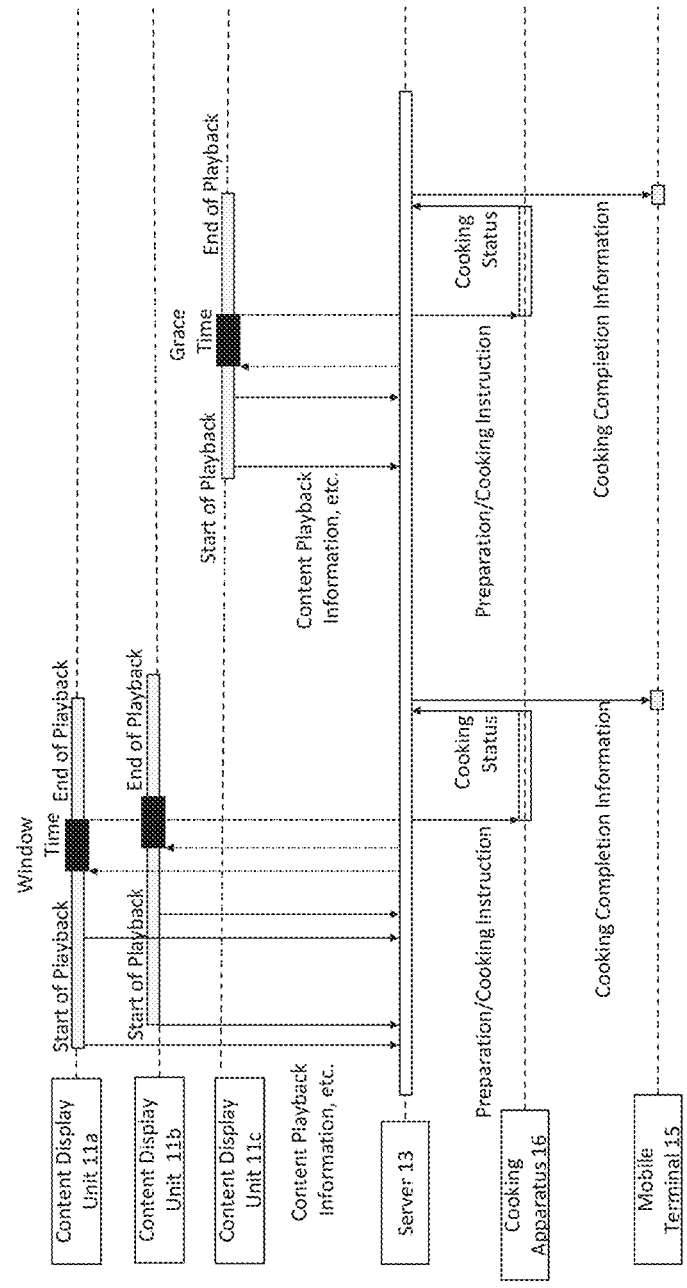
FIG. 2 shows a sequence of operation performed by the system of Embodiment 1.

Specifically, the controller 132 receives content playback information for each of the content display devices 11 and specifies one or more content display devices that will finish the playback of the content within a given time (e.g., within five minutes) based on the playback information. In particular, as shown in FIG. 2, the controller 132 sets a grace time corresponding to a given time, for each of the plurality of content display devices 11. The controller 132 sets, based on the content playback information, the grace time followed by the time when the cooking apparatus 16 starts preparation or cooking. The controller 132 determines the first content display device 11a which will start its grace time earliest among the plurality of content display devices 11. The controller 132 determines any other content display device 11b that will start its grace time between the start and the end of the grace time of the first content display device 11a. The preparation/cooking instruction for the cooking apparatus 16 is produced according to the number (two in this example) of content display devices including the first content display device 11a and the other content display device 11b.

The preparation/cooking instruction includes, for example, identification information of the cooking apparatus 16, a subject to be prepared or cooked, a preparation/cooking time, or an amount of preparation or cooking. In a case where the cooking apparatus 16 is a coffee maker, the controller 132 transmits a preparation/cooking instruction to start extraction of coffee for two passengers, to the cooking apparatus 16 via the transmitter 131.

The given time is adjusted in length according to, for example, one or more of the following: the number of the content display devices 11, the type of the cooking apparatus 16 (for example, a coffee maker, a rice cooker, a microwave oven, an oven, etc.), the subject to be prepared or cooked (for example, coffee, rice, bread or a dish such as steak), or the time required for preparing or cooking the subject.

The start of preparation/cooking for each of the plurality of content display devices 11 is set such that the preparation/cooking time of the cooking apparatus 16 will end by the end of the playback of each content. The grace time ends at the start of preparation/cooking.

1-2. Operation

FIG. 3 shows a flowchart of operation of the cooking control method performed by the server 13 of the cooking control system 1.

The controller 132 of the server 13 receives content playback information for each of the content display devices 11, and determines a time to finish the playback of content (S101). The controller 132 receives the playback information such as a playback position or a playback stop position of the content at regular intervals, from each of the content display devices 11 via the transmitter 131. The controller 132 determines the time to finish the playback of the content based on the received playback information.

The controller 132 sets or changes the grace time (S102). The grace time is adjusted in length according to, for example, one or more of the following: the number of the content display devices 11 as targets, the type of the cooking apparatus 16 (for example, a coffee maker, a rice cooker, a microwave oven, an oven, etc.), the subject to be prepared or cooked (for example, coffee, rice, bread or a dish such as steak), and the time required for preparing or cooking the subject.

The controller 132 determines the first content display device 11a whose grace time will start earliest among the content display devices 11 that are playbacking content (S103). When the grace time of the first content display device 11a starts (S104), the controller 132 determines whether there is any other content display device whose grace time will start (S105). If there is any other content display device whose grace time will start, the device identification information of the other content display device 11 (the content display device 11 b in the example of FIG. 2) is stored (S106). The determination process of S105 is repeated until the grace time of the first content display device 11a ends (S107).

If there is no other content display device whose grace time overlaps, such as the content display device 11c as shown in FIG. 2, a preparation/cooking instruction for only the content display device 11c is produced to start preparation or cooking.

The controller 132 specifies a target cooking apparatus (e.g., coffee maker) (S108). The cooking apparatus 16 is not limited to a single apparatus, but a plurality of cooking apparatuses 16 may be operated at a time. In that case, the controller 132 of the server 13 produces and transmits a preparation/cooking instruction for each of the target cooking apparatuses 16.

The controller 132 produces a preparation/cooking instruction (S109). The preparation/cooking instruction includes, for example, identification information of the cooking apparatus 16, a subject to be prepared or cooked, a preparation/cooking time, or an amount of preparation or cooking. In a case where the cooking apparatus 16 is a coffee maker, the controller 132 transmits a preparation/cooking instruction to start extraction of coffee for two passengers, to the cooking apparatus 16 via the transmitter 131. The controller 132 transmits a preparation/cooking instruction to the specified cooking apparatus 16 (110).

Upon receiving the preparation/cooking instruction, the cooking apparatus 16 starts preparation or cooking according to the preparation/cooking instruction as described above. For example, in the case of a coffee maker, the cooking apparatus 16 sets an extraction amount of coffee as the preparation/cooking amount and starts to extract coffee.

The above operational flow is one example. The order and the execution timing of the processes may be changed within a reasonable range. Some processes may be performed at the same time. In steps S104 to S107 for determining the other content display device whose grace time overlaps with that of the first content display device 11a, the controller may instead compare the grace times between the other content display devices and determine if there is any content display device having an overlapping grace time before the start of the grace time of the first content display device 11a.

1-3. Features

According to the server 13 in the cooking control system 1 or the cooking control method performed by the server 13, content playback information is received for the plurality of content display devices 11 respectively, and one or more of the plurality of content display devices 11 that will finish the playback of content within a given time is determined based on the content playback information. A preparation/cooking instruction for one or more cooking apparatuses 16 is produced according to a number of the one or more of the plurality of content display devices. The preparation/cooking instruction is transmitted to the one or more cooking apparatuses 16.

According to the cooking control system 1, the content display device 11 for playbacking content for the in-flight entertainment is operated in association with the cooking apparatus 16, and a subject that a passenger wants to have after finishing with the content can be prepared or cooked in advance. Accordingly, the workload of a crew member can be reduced. Furthermore, it is possible to automatically control the preparation/cooking time and the preparation/cooking amount of the cooking apparatus 16 so as to meet the number of passengers who will finish with the content at a similar timing to each other, and therefore the crew member can provide food/beverages to a plurality of passengers in an efficient manner.

1-4. Modified Examples

1-4-1

In the above example, the grace time is set to each content display device 11 that is playbacking content, one or more content display devices 11 whose grace times overlap with each other are determined, and preparation or cooking is controlled according to the number of the determined content display devices. Alternatively, the controller 132 of the server 13 may receive a time to finish the playback of content of each content display device 11, which is playbacking the content, determine one or more content display devices 11 whose content finishing time fall within a given time, and control preparation or cooking according to the number of the determined content display devices. In this case, when a remaining time length of the content playback by the content display device 11, which has the earliest finishing time, reaches a predetermined time length, a preparation/cooking instruction for the cooking apparatus 16 is produced and transmitted according to the number of the content display devices including the other content display devices 11.

According to this cooking control, it is possible to efficiently provide food/beverages to a plurality of passengers at a timing to finish the playback of the content.

1-4-2

In the above example, the server 13 may perform the above control by determining one or more content display devices 11 that will finish the playback of content with a similar timing to each other, at regular intervals or according to an input signal from the mobile terminal 15 carried by a crew member.

1-4-3

The controller 132 of the server 13 may change or cancel the preparation/cooking instruction as described above, in response to occurrence of a reason for discontinuation of preparation or cooking.

In the above cooking control method, the cooking apparatus is controlled so that food/beverages can be provided to passengers at a timing to finish the playback of content. However, for some reasons, the time to provide food/beverages needs to be changed. In this modified example, the above control of the cooking apparatus can be changed or cancelled in response to occurrence of a reason for preparation/cooking discontinuation.

The reason for preparation/cooking discontinuation may be, for example, the aircraft making a landing before the preparation/cooking starts, or occurrence of turbulence.

Figure 4:
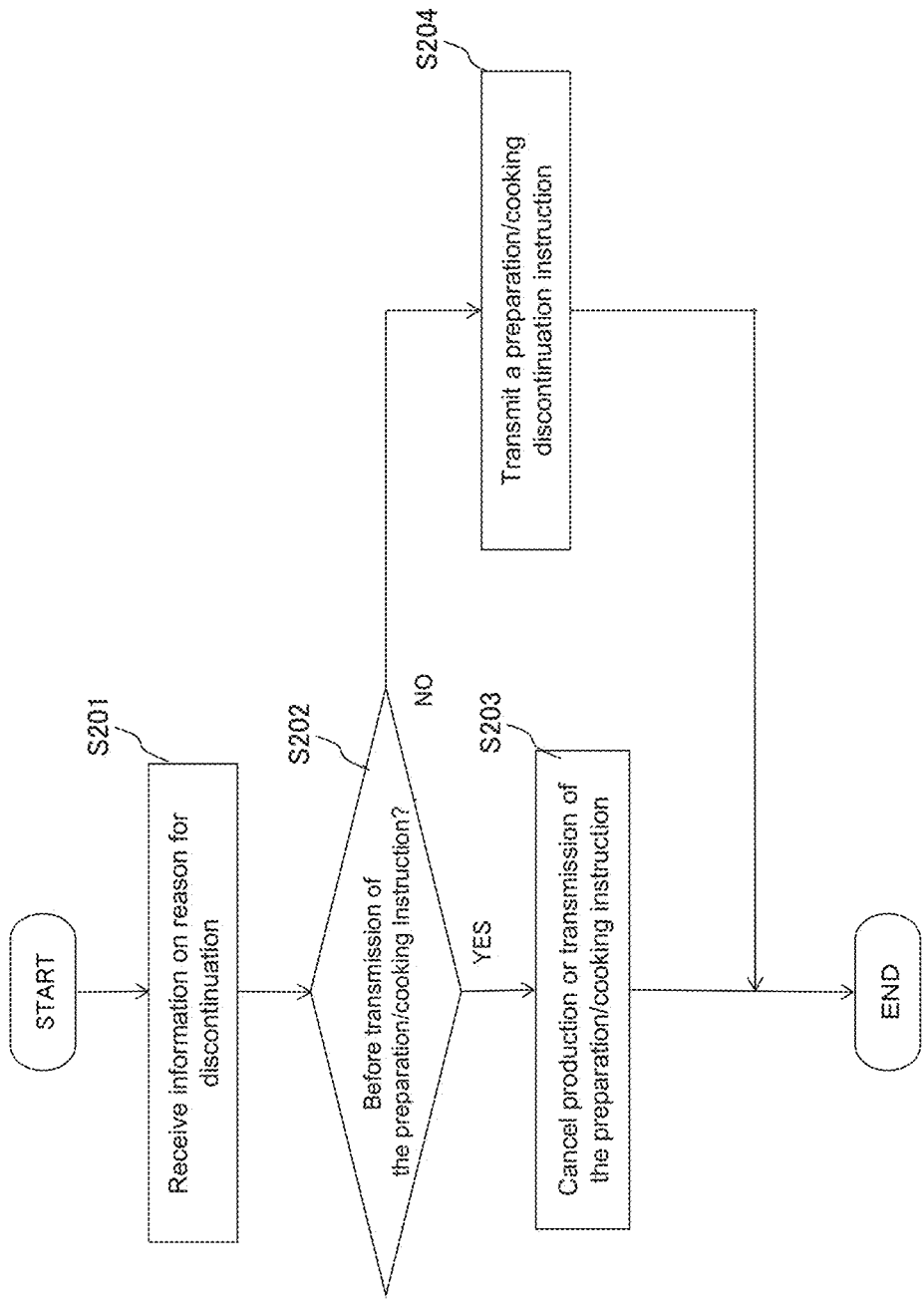
FIG. 4 shows a flowchart illustrating an operation performed by a server according to a modified example of Embodiment 1.

As shown in FIG. 4, for example, the controller 132 of the server 13 detects receipt of information corresponding to a reason for preparation/cooking discontinuation, from the in-flight system (S201). The information corresponding to a reason for preparation/cooking discontinuation is, for example, a time of arrival at a destination of the aircraft or a forecasted occurrence of turbulence. The controller 132 may determine the time of occurrence of these events from a seat-belt sign turned on in the aircraft. Upon receiving one or more of such information from the in-flight system, the controller 132 adjusts the preparation/cooking control for the cooking apparatus 16. Specifically, the controller cancels production or transmission of the preparation/cooking instruction, or producing and transmitting an instruction to cancel the preparation or cooking, in order for the preparation/cooking time not to overlap the time for the aircraft landing or occurrence of turbulence.

The controller 132 determines whether it is before the transmission of the preparation/cooking instruction produced in step S109 in FIG. 3 (S202), and if it is before, cancels the production or the transmission of the preparation/cooking instruction (S203). If it is after the transmission of the preparation/cooking instruction, the controller then transmits an instruction to cancel the preparation or cooking. As a result, the cooking apparatus 16 cancels the preparation or cooking.

The reason for discontinuation may be that a passenger has gone to sleep during the playback of content. In this case, the controller 132 determines that the playback of content has been stopped for a certain period of time based on the content playback information transmitted from the content display device 11, and cancels the preparation/cooking instruction based on the determination. Alternatively, the controller 132 may receive image information including an image of a passenger, which is captured by a camera for taking an appearance of the passenger, determine whether the passenger is sleeping based on the image information, and cancel the above preparation/cooking instruction based on the determination. The determination of whether the passenger is sleeping can be made based on, for example, a movement of an eyelid of the passenger.

The controller 132 may produce and transmit a new preparation/cooking instruction to start preparation or cooking by the cooking apparatus 16, when receiving information that there is no longer the reason for discontinuation (e.g. passing of turbulence, restarting of operation of the content display device 11 by the passenger, determination based on the image information).

1-4-4.

The controller 132 of the server 13 may change or cancel the preparation/cooking instruction in response to the instruction from a passenger or a crew member.

Figure 5:
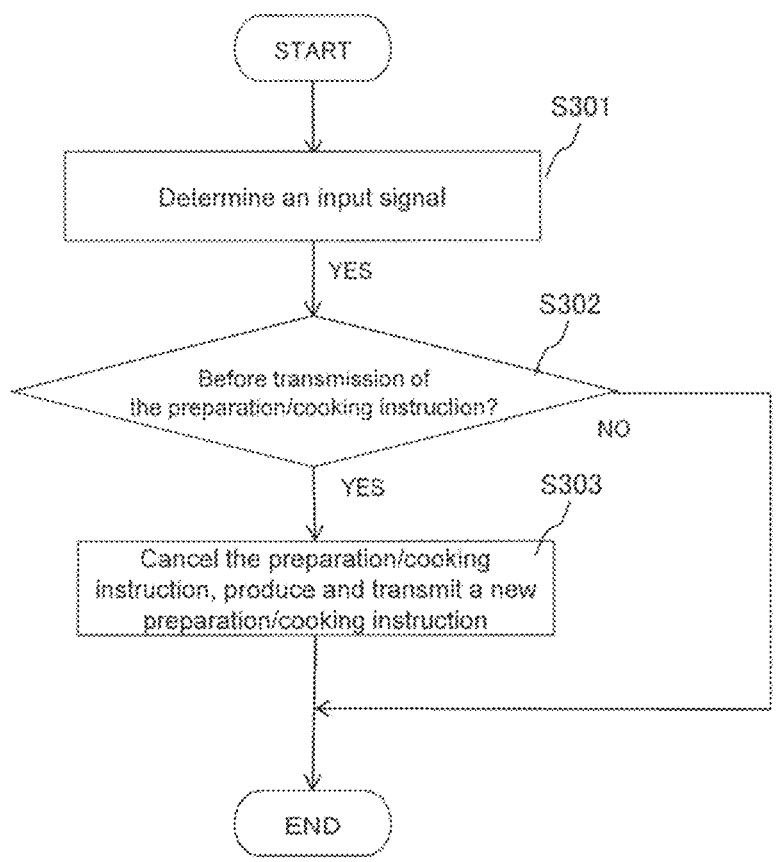
FIG. 5 shows a flowchart illustrating an operation performed by a server according to another modified example of Embodiment 1.

For example, as shown in FIG. 5, the controller 132 of the server 13 determines an input signal from outside, or a plurality of content display devices 11 (S301). The input signal from the content display device 11 is transmitted to the server 13 by an input operation of the passenger with respect to the content display device 11. The input signal includes the time when the passenger wants to be provided with a prepared or cooked subject regardless of the time to finish the playback of content.

The controller 132 determines whether it is before the transmission of the preparation/cooking instruction produced in S109 in FIG. 3 (S302), and if it is before, changes the preparation/cooking instruction so as to complete the preparation or cooking at the time as instructed by the input signal (S303).

The input signal may be transmitted from the mobile terminal 15 operated by a crew member.

1-4-5

In the above example, the server 13 manages the playback state of each content display device 11 and receives the time to finish the playback of content, but this is not the only option. Instead of the server 13, each content display device 11 may manage the playback state of content by itself, and transmit to the server 13 the time to finish the playback of content as the playback information.

1-4-6

The cooking apparatus 16 may be provided in the galleys located at a plurality of places in the cabin (in the front, center, rear, etc.). In this case, based on the seat information (seat number) at which the content display device 11 as indicated by the device identification information of the content display device 11 is installed, the controller 132 of the server 13 may give an instruction to start preparation or cooking to the cooking apparatus 16 which is located at a galley closest to the seat.

1-4-7

Further, the controller 132 of the server 13 may inform the mobile terminal 15 carried by a crew member by text or voice that the movie being watched by a passenger of a seat (for example, the seat 20A) is about to end or that coffee is now being extracted for the passenger, based on the device identification information indicating the content display device 11 installed at the seat. The controller 132 may cause the display 113 of the content display device 11 to output a sentence or image describing the dish to be provided via the transmitter 131.

1-4-8

The controller 132 of the server 13 may receive information indicating the serving state of food/beverages via the transmitter 131 and transmit the information to the mobile terminal 15. The information indicating the serving state of food/beverages may be transmitted from the mobile terminal 15 as operated by a crew member, or may be transmitted from a galley where the cooking apparatus 16 is installed. The information indicating the serving state of food/beverages may be received from ID information read from an ID tag attached to a tray to be served to each seat. The ID tag may be a two-dimensional barcode such as a barcode or a QR code, a color pattern, an OCR, or an RFID that transmits information wirelessly. Since the crew member can automatically perceive whether food/beverages are provided or not, the efficiency of his/her work can be improved.

1-4-9

The controller 132 of the server 13 may store in advance the number or quantity of food/beverages loaded in the aircraft, calculate the remaining number or quantity of food/beverages based on the number or quantity of food/beverages provided to passengers, and transmit the calculated information to the mobile terminal 15. Further, based on the information on the remaining number or quantity of food/beverages, the controller 132 may transmit information on a necessity for replenishment or the like to the mobile terminal 15. Since the crew member can automatically perceive the remaining number or quantity of food/beverages, the efficiency of his/her work can be improved.

1-4-10

The controller 132 of the server 13 may include a time of a scene change as the time to finish the playback of content, and may output a preparation/cooking instruction according to the scene change. In this case, based on the content playback information (for example, a playback position such as chapter information), the controller 132 determines a content display device 11 whose playback position with a predetermined chapter number is coming close in S105 of FIG. 3 and stores the device identification information of such content display device 11 in S106. Similarly to the above example, the preparation/cooking instruction is produced according to the number of content display devices including the first content display device 11a and the other content display device 11b, and is transmitted (S108 to S110).

As a result, food/beverages can be provided to the passenger at a timing when the passenger reduces his/her concentration on viewing content due to a scene change.

1-4-11

The controller 132 of the server 13 may acquire the language played in the content or language information on the displayed language from the content display device 11, estimate the nationality or place of residence of the viewing passenger, and determine preparation or cooking settings (e.g., preparation temperature, doneness, etc.) tailored to the preference of the passenger. For example, in a case where a certain seat class (business class or first class) has a large number of passengers from Southeast Asia, the controller 253 instructs the cooking apparatus 16 (rice cooker) to cook hard rice. Note that the preference of each passenger may be estimated dynamically as described above or may be determined on the basis of a client database storing the association between each passenger boarded in the past and the corresponding food/beverage preparation history (e.g., temperature of the soup, doneness of the meat, etc.).

1-4-12

Figure 6:
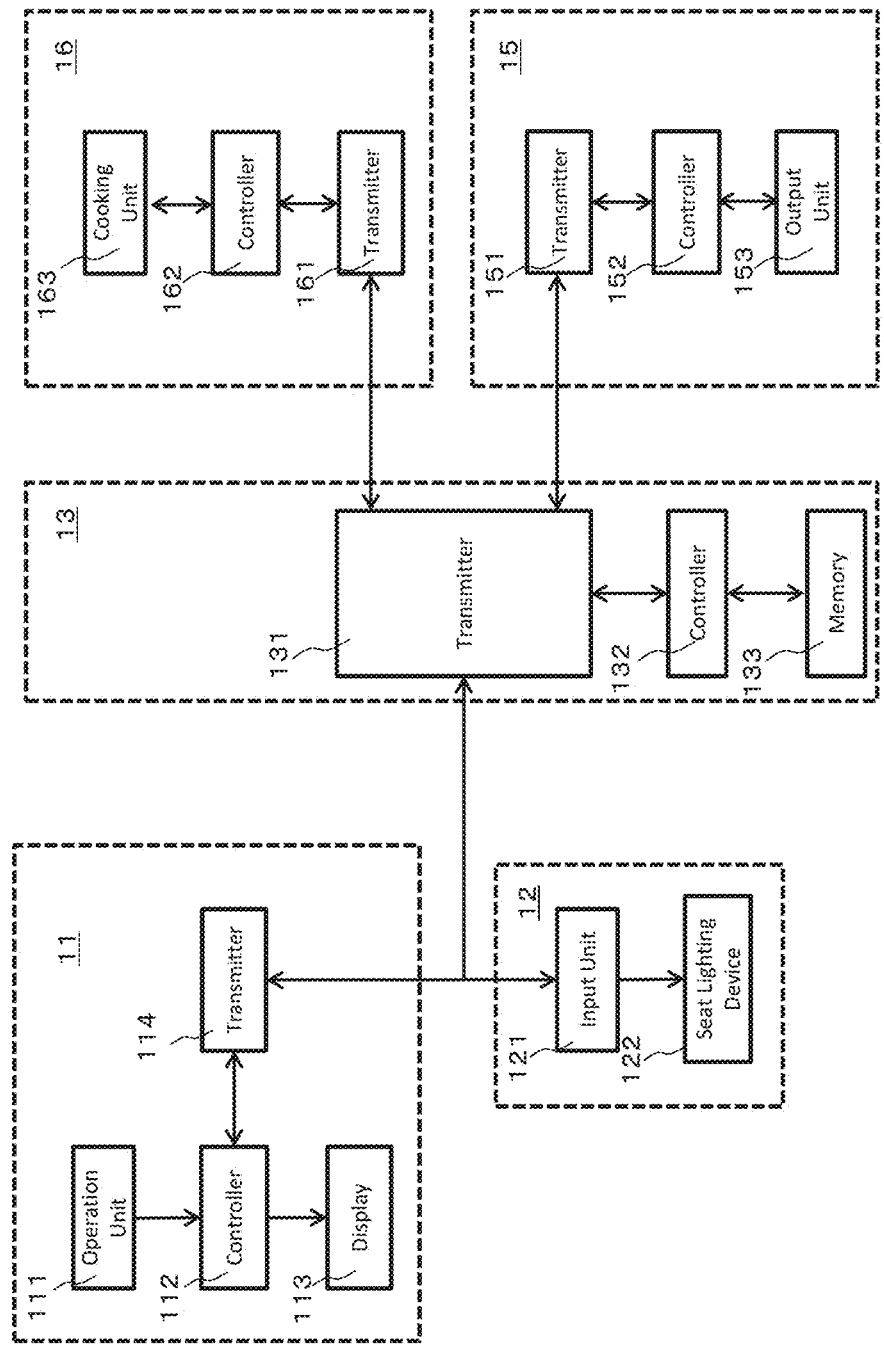
FIG. 6 shows the whole configuration of a cooking control system according to a still other modified example of Embodiment 1.

FIG. 6 shows a configuration of a cooking control system 1A according to a modified example. The cooking control system 1A includes a lighting device 12 in addition to the cooking control system 1 of FIG. 1.

The lighting device 12 is, for example, a reading light corresponding to a seat on which the content display device 11 is disposed. The lighting device 12 has an input unit 121 and a seat lighting unit 122.

The input unit 121 is connected to the in-flight network and accepts a lighting-up instruction or a lighting-out instruction from the server 13. The seat lighting unit 122 is a light source such as an LED, and makes the vicinity of the hands of the passenger bright by illuminating the surroundings of the seat of the passenger, even when the lighting of the entire cabin is off. The seat lighting unit 122 turns on or off in response to an instruction received from the input unit 121. The controller 132 of the server 13 controls the lighting device 12 to turn on or turn off for each seat, via the transmitter 131. Specifically, upon finishing of the playback of the content viewed by the passenger, such as a movie, the controller 132 turns on the lighting device 12 via the transmitter 131 when the lighting device 12 is turned off. In tuning on the lighting device 12, the hue, brightness, and intensity different from those when the reading light is used, may be set in accordance with the dish to be provided by the above preparation/cooking instruction. At the same time, the controller 132 may output a sentence or image describing the dish to be provided, to the display 113 of the content display device 11 via the transmitter 131.

1-4-13

There exist plenty of instances other than during the playback of content as described above, where the crew member can determine when to provide food/beverage to a passenger. For example, in business class or first class, cooking and serving are conducted by providing a meal in courses of an aperitif, an appetizer, soup, an entree, a dessert, and an after-meal drink. Unfortunately, it is difficult for the crew member to execute food/beverage preparation while being fully aware of the passenger's progress of food intake.

The content display device 11, therefore, may further have an imaging unit (not shown) to capture a video of the passenger or the tableware on the table of the passenger and transmit the video to the server 13. The controller 132 of the server 13 specifies, for example, the tableware from the video and determines the passenger's progress of food intake on the basis of the presence/absence or amount of food on the plates. Furthermore, when the passenger is about to finish eating the currently provided dish (e.g., soup), the controller 132 instructs the cooking apparatus 16 to start preparing the dish to be provided next (e.g., entree). At the same time, the controller 132 informs the mobile terminal 15 carried by the crew member by text or voice or the like, that the passenger in the seat (e.g., seat 10A) installed with the content display device 11 indicated by the device identification information is about to finish eating the currently provided dish. Therefore, cooking and serving can be executed in accordance with the passenger's progress of food intake, reducing the amount of time the passenger waits until the subsequent dish is provided.

Note that the level of satisfaction of the passenger may be estimated from the face of the passenger and the amounts of foods on plates, which are contained in the video captured by the imaging unit, and then the passenger and the level of satisfaction of the passenger may be stored in the client database described above. Additionally, how much of each of the provided dishes is eaten may be stored in the memory 133 as statistical information, so that such information can be utilized for creating a menu next time or for planning to load each dish into the aircraft.

Embodiment 2

2-1. Problems

In traveling long distance by aircraft for a long time, the aircraft offers time periods to encourage passengers to sleep, by turning off all the lights on the aircraft with consideration for the local times of the departure location and the arrival location.

In such a case, upon awakening, some passengers often first order food or beverages (e.g., hot coffee) to quench the thirst of the passengers, due to the temperature, humidity, and air conditioning on the aircraft. Specifically, crew members respond to calls from the passengers, go to the seats of the passengers to take orders for food and beverages, operate cooking apparatuses at galleys to prepare the food and beverages, and then carry the food and beverages to the seats of the passengers; a large amount of workload is involved. On the other hand, it takes a lot of time and trouble for the passengers to receive the prepared food and beverages since awakening; the passengers might not be able to enjoy the food and beverages when they desire.

2-2. Configurations and Operations

Figure 7:
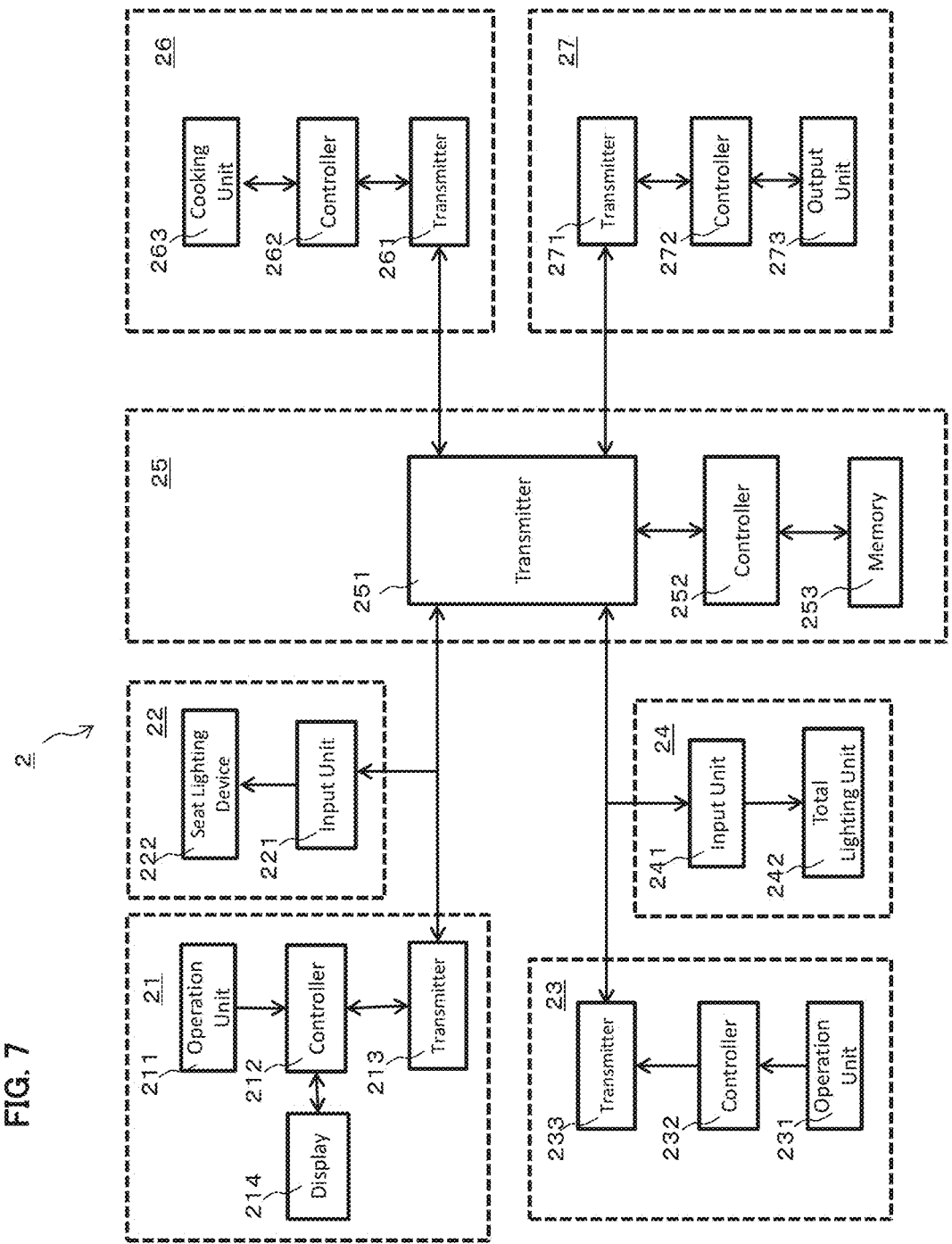
FIG. 7 shows the whole configuration of a system according to Embodiment 2.

As shown in FIG. 7, a cooking control system 2 according to Embodiment 2 includes a content display device 21, a lighting device 22, an input device 23, a lighting device 24, a server 25, a cooking apparatus 26, and a mobile terminal 27.

2-2-1. Configuration and Operation of Content Display Device 21

The content display device 21 is, for example, a controller installed for each seat on the aircraft and operated to turn the lighting device 22 on/off, call a crew member, play/stop an in-flight entertainment content (movies, dramas), and the like. The content display device 21 has a similar configuration to Embodiment 1, and includes an operation unit 211, a controller 212, a transmitter 213, and a display 214.

The operation unit 211 receives an operation input by a passenger. For example, upon receipt of an input instructing to turn on the lighting device 22, the operation unit 211 outputs a lighting-up instruction to the controller 212. Note that the operation unit 211 may be a physical button or a touch panel disposed on the display 214.

The controller 212 controls the overall operation of the content display device 21. When the lighting-up instruction is issued from the operation unit 211, the controller 212 transmits the lighting-up instruction to the lighting device 22 via the transmitter 213, and transmits information indicating the corresponding seat number and ON/OFF of the corresponding lighting (referred to as "seat lighting information," hereinafter) to the server 25.

The transmitter 213 is connected to the lighting device 22 and the server 25 via an in-flight network (which may be wired or wireless) and sends and receives various kinds of information.

2-2-2. Configuration and Operation of Lighting Device 22

Now, the lighting device 22 is, for example, a reading light corresponding to each of the seats on which the content display device 21 is disposed. The lighting device 22 has an input unit 221 and a seat lighting unit 222.

The input unit 221 is connected to the in-flight network and accepts the lighting-up instruction and a lighting-out instruction from the content display device 21.

The seat lighting unit 222 is a light source such as an LED, and makes the vicinity of the hands of the passenger bright by illuminating the surroundings of the seat of the passenger even when the lighting device 24 (the lighting of the entire cabin) described hereinafter is off. The seat lighting unit 222 turns on and off in response to the instruction received from the input unit 222.

2-2-3. Configuration and Operation of Input Device 23

Next, the input device 23 is, for example, a touch panel used by a crew member to adjust the lighting and air conditioning of the entire cabin, manage seats, make in-flight announcements, and the like. The input device 23 is a computer terminal and includes an operation unit 231, a controller 232, and a transmitter 233.

The descriptions of the operations of the operation unit 231, the controller 232, and the transmitter 233 overlap with that of the content display device 21 and therefore are omitted accordingly. However, the difference between the input device 23 and the content display device 21 is that the input device 23 issues an instruction to turn the lighting of the entire cabin on/off instead of the lighting of each seat, which is the case with the content display device 21. Therefore, the input device 23 transmits not the information indicating the seat number but information indicating ON/OFF of the lighting of the entire cabin (referred to as "total lighting information") to the server 25.

2-2-4. Configuration and Operation of Lighting Device 24

Now, the lighting device 24 is a cabin light attached to, for example, the ceiling of the aircraft or in the vicinity of a storage in the aircraft. The lighting device 24 has an input unit 241 and a total lighting unit 242.

The description of the operation of the input unit 241 overlaps with that of the lighting device 22 and is therefore omitted accordingly.

The total lighting unit 242 is a light source such as an LED and is turned off at once at the time for encouraging the passengers to sleep as described above, or is turned on at once to wake up the passengers in line with providing in-flight meals, in response to an instruction from the input unit 241. Note that the total lighting unit 242 may be turned on immediately in response to a lighting-up instruction from the input unit 241 or turned on in such a manner as to gradually increase the level of illumination over a predetermined period (e.g., thirty minutes).

2-2-5. Configuration and Operation of Server 25

Now, the server 25 has a similar configuration to the server 13 of Embodiment 1 and includes a transmitter 251, a controller 252, and a memory 253.

The transmitter 251 is connected to the in-flight network, receives the information from the content display device 21 and the input device 23 (the seat lighting information, the total lighting information), and transmits the received information to the controller 252. The server 25 also transmits the information to the cooking apparatus 26 or the mobile terminal 27 in response to an instruction from the controller 252.

On the basis of the information received from the transmitter 251, the controller 252 manages the lighting condition of each seat and the lighting condition of the entire cabin, and determines the details of processing to be performed on the cooking apparatus 26 or the mobile terminal 27. The memory 253 stores information received from the transmitter 251 and information on the content.

Specifically, when the controller 252 receives the seat lighting information (e.g., seat 20A, lighting ON) when the total lighting information indicates OFF, the controller 252 determines that the passenger in seat 20A woke up, and transmits information for instructing to start extracting coffee to the cooking apparatus 26 (e.g., coffeemaker) through the transmitter 251. At the same time, the controller 252 informs the mobile terminal 27 held by the crew member by letters, sound or the like, that the passenger in seat 20A woke up and that the coffee is being extracted.

Note that the cooking apparatus 26 is provided in each of galleys located in a plurality of locations in the aircraft (the front, the center, the rear etc. of the aircraft). On the basis of the seat number contained in the seat lighting information, the controller 252 may instruct the cooking apparatus 26 of the closest galley to start preparing food/beverages.

Furthermore, upon receipt of the total lighting information (ON), the controller 252, in the expectation that a lot of passengers wake up, sets the amount of coffee to extract at a higher amount than when the seat lighting information (seat 20A, ON) is received, and instructs the cooking apparatuses 26 (e.g., coffeemakers) to extract the set amount of coffee. Upon receipt of the total lighting information (ON), the controller 252 may instruct the cooking apparatuses 26 of the plurality of galleys to start preparing food/beverages at once.

In a case where the total lighting unit 242 indicated by the total lighting information (ON) lights up by gradually increasing the level of illumination over the course of a predetermined period (e.g., thirty minutes), sometimes the passengers do not wake up even after food and beverages are prepared, and consequently the temperatures, tastes, and freshness of the prepared food and beverages deteriorate over time. Therefore, the controller 252 may instruct the cooking apparatuses 26 to start preparing food and beverages after a lapse of a predetermined period (e.g., five to twenty minutes) since the receipt of the total lighting information (ON).

2-2-6. Configuration and Operation of Cooking Apparatus 26

Now, the cooking apparatus 26 is a coffeemaker, a microwave, an oven, or a rice cooker, but a coffeemaker is described herein as an example of the cooking apparatus 26. The cooking apparatus 26 has a similar configuration to the cooking apparatus 16 of Embodiment 1, and includes a transmitter 261, a controller 262, and a cooking unit 263.

The transmitter 261 is connected to the in-flight network, receives from the server 25 information indicating the time to start preparation or cooking or the amount of preparation or cooking, and transmits the received information to the controller 262.

The controller 262 sets the amount of preparation or cooking, and instructs the cooking unit 263 to start the preparation or cooking.

It should be noted that, once the controller 262 detects completion of the preparing or cooking by the cooking unit 263, the controller 262 may inform the mobile terminal 27 of the completion through the server 25.

In a case where the cooking apparatus 26 is a coffeemaker, the cooking unit 263 executes the steps of supplying water, heating the water, grinding beans, drip-brewing, and the like on the basis of the amount of coffee to extract, which is set by the controller 262.

2-2-7. Configuration and Operation of Mobile Terminal 27

Now, the mobile terminal 27 is, for example, a smartphone or a tablet which is carried and held by the crew member at work. The mobile terminal 27 has a similar configuration to the mobile terminal 15 of Embodiment 1 and includes a transmitter 271, a controller 272, and an output unit 273.

The transmitter 271 is connected to the in-flight network and receives, from the server 25, the seat lighting information (e.g., seat 20A, ON), preparation progress information on the cooking apparatus 26 (indicating whether food/ beverage preparation is in progress or completed), location information on the cooking apparatus 26 (e.g., the rear of the aircraft) that has completed the food/beverage preparation.

The controller 272 converts the formats of these various kinds of information received by the transmitter 271 into an outputable format, and transmits the resultant information to the output unit 273.

The output unit 273 is a display or a speaker and serves not only to inform the receipt of the information through display or using a sound, but also to display such details as the seat lighting information (e.g., seat 20A, ON), the preparation progress information on the cooking apparatus 26 (indicating whether food/beverage preparation is in progress or completed), and the location information on the cooking apparatus 26 (e.g., the rear of the aircraft) that has completed the food/beverage preparation. Such configuration allows the crew member to recognize that the passenger in seat 20A has woken up, so that the crew member can start carrying coffee and prepare for an in-flight meal service.

2-3. Effects

According to the above embodiment, the server 25 produces the information indicating a start of preparation or cooking or an amount of preparation or cooking, transmits the information to the cooking apparatus 26, and controls the cooking apparatus 26. Accordingly, the workload of the crew member can be reduced by operating the seat lighting and the total lighting of the aircraft together with the cooking apparatus and preparing food and beverages desired by the passengers upon awakening. In addition, the passengers' trouble of waiting to receive the prepared food and beverages after waking up can also be reduced in accordance with the behaviors of the passengers.

Embodiment 3

3-1. Problems

In traveling long distance by aircraft for a long time, the air pressure in the aircraft changes depending on the travel condition thereof. As a result, the taste and texture of an in-flight meal fluctuate even if the preparation time and the preparation temperature are set evenly.

Therefore, while it is preferred that the crew member optimize the preparation settings in view of the condition of the aircraft during food/beverage preparation, the crew member is required to carry out many tasks in addition to food/beverage preparation, such as responding to calls from passengers and going to the seats of the passengers to take orders for food and beverages. Thus, being held at a galley to prepare food/beverage for a long period of time is not desirable for the crew member. It is also difficult for the crew member to understand the information on the air pressure in the aircraft and accordingly establish an optimal food/beverage preparation environment.

3-2. Configurations and Operations

Figure 8:
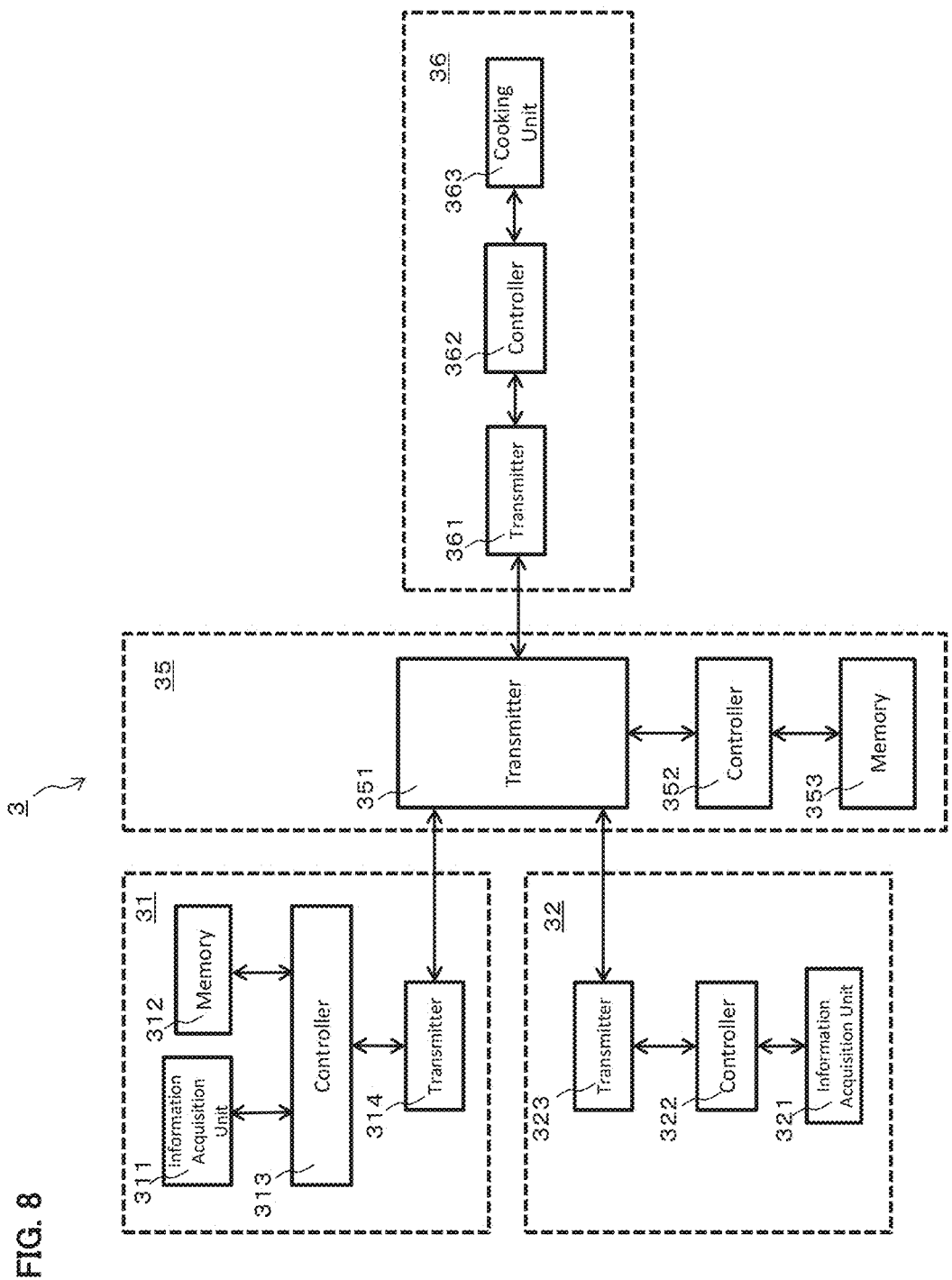
FIG. 8 shows the whole configuration of a system according to Embodiment 3.

As shown in FIG. 8, a cooking control system 3 according to Embodiment 3 includes a location management device 31, a sensor 32, a server 35, and a cooking apparatus 36.

3-2-1. Configuration and Operation of Location Management Device 31

The location management device 31 is installed in, for example, an aircraft cockpit. A pilot acquires location information on the aircraft from the location management device 31, the location information including present location information and flight path information on the aircraft. The location management device 31 is a computer device including a location information acquisition unit 311 for acquiring location information of the aircraft, a memory 312, a controller 313, and a transmitter 314.

The location information unit 311 is, for example, a global positioning system (GPS), which acquires the location information (present location) on the aircraft and outputs the location information on the aircraft to the controller 313.

The memory 312 stores the location information on the aircraft acquired from the controller 313. The memory 312 also stores information on a scheduled flight path (including altitude information) from the departure location to the destination, estimated arrival time information on the estimated time of arrival at the destination, and the like. The memory 312 may also store information on weather (forecast) along the scheduled flight path. Note that the weather information may be stored in the memory 312 prior to departure or dynamically acquired via satellite communication or a ground base station during the flight.

The controller 313 controls the entire location management device 31 and transmits the location information acquired from the location information acquisition unit 311 and the flight path information and estimated arrival time information stored in the memory 312 to the server 35 via the transmitter 314.

The transmitter 314 is connected to the server 35 via the in-flight network (which may be wired or wireless) and sends and receives various kinds of information.

3-2-2. Configuration and Operation of Sensor 32

Next, the sensor 32 is, for example, a barometer equipped in the aircraft. A barometer is described herein as an example of the sensor 32, but the sensor 32 is not limited thereto and may be a sensor for measuring the environment outside the aircraft, such as a thermometer, a hygrometer, an oxygen meter, and an altimeter. The sensor 32 includes an information acquisition unit 321, a controller 322, and a transmitter 323.

The information acquisition unit 321 is connected to the controller 322 and serves to notify the controller 322 of the acquired air pressure information on the aircraft.

The controller 322 transmits the air pressure information received from the sensor 32, to the server 35 via the transmitter 323.

The description of the operation of the transmitter 323 overlaps with that of the location management device 31 and is therefore omitted accordingly.

3-2-3. Configuration and Operation of Server 35

Now, the server 35 is an example of a control device having a similar configuration to the server 13 of Embodiment 1 and comprises a transmitter 351, a controller 352 and a memory 353.

The transmitter 351 is connected to the in-flight network, receives the information from the location management device 31 and the sensor 32 (the location information on the aircraft, the air pressure information on the aircraft, etc.), and transmits the received information to the controller 352. The transmitter 351 also transmits the information to the cooking apparatus 36 in response to an instruction from the controller 352.

The controller 352 estimates a change in the air pressure from the aircraft location information and flight path information acquired from the location management device 31 via the transmitter 351, the air pressure information on the aircraft acquired from the sensor 32 via the transmitter 351, and the like. From the predicted air pressure, the controller 352 further calculates the preparation settings (preparation time, temperature, etc.) ideal for food/beverage preparation.

Furthermore, the preparation settings calculated by the controller 352 are transmitted to the cooking apparatus 36 via the transmitter 351.

Specifically, when the aircraft reaches a high altitude, that is, when the air pressure of the aircraft drops, the boiling point decreases. Therefore, it is expected from the flight path information or aircraft location information acquired from the location management device 31 that the altitude of the aircraft increase. In this case, the controller 352 transmits information instructing to cut the preparation/cooking time, to the cooking apparatus 36 via the transmitter 351.

The controller 352 also acquires the aircraft location information and expected arrival time information from the location management device 31 via the transmitter 351. When it gets to a given time followed by the arrival time approaches, the controller 352 instructs the cooking apparatus 36 (e.g., coffeemaker) to reduce the amount of coffee to extract. In addition, shortly after the aircraft shifts to horizontal flight after takeoff, the controller 352 may instruct the cooking apparatus 36 to increase the amount of coffee to extract.

The controller 352 may also determine the preparation settings in further consideration of information on a food item to be prepared, in addition to the environmental information (air pressure, etc.) about the outside of the aircraft. For example, in a case where the food item is rice, the method of preparing rice may be changed depending on the type of the rice, the rice production area, etc., or in a case where the food item is meat, the preparation settings (preparation temperature, time) for the meat may be adjusted since the firmness of the meat or the amount of fat contained in the meat varies depending on the type of the meat, the meat production area, and the like.

3-2-4. Configuration and Operation of Cooking Apparatus 36

Now, the cooking apparatus 36 is a coffeemaker, a microwave, an oven, or a rice cooker, but a coffeemaker is described herein as an example of the cooking apparatus 36. The cooking apparatus 36 has a transmitter 361, a controller 362, and a food/beverage cooking unit 363.

The transmitter 361 is connected to the in-flight network, receives from the server 35 information indicating the time to start preparing coffee or information indicating coffee preparation settings, and transmits the received information to the controller 362.

The controller 362 sets the amount of preparation or cooking, the preparation/cooking time, and the preparation/cooking temperature, and instructs the cooking unit 363 to start preparing or cooking.

3-3. Others, Additional Example

It is difficult to automate all of the preparation processes for some of the meals provided in the aircraft; it is assumed that some of the meals need to be prepared by the crew member. However, since the crew member needs to execute many tasks other than preparing food/beverages, food/beverage preparation needs to be made more efficient.

Therefore, the cooking control system 3 according to the present embodiment may further have a terminal device (not shown) that is similar to the mobile terminal 15 of Embodiment 1 or the input device 23 of Embodiment 2. The terminal device is a display, a projector, a wearable device carried by the crew member, or the like, and visibly displays a food/beverage preparation procedure (particularly, the step to be executed next) to the crew member. In a case where the terminal device is a projector, an image or task details can be projected as a mark onto the place (a drawer of a galley chiller) associated with the step to be executed next (e.g., taking out a food item from the galley chiller) by utilizing a projection mapping technique. In this manner, the work efficiency of the crew member can be improved.

3-4. Effects

High quality in-flight meals can be provided to passengers by linking the flight path information and present location information on the aircraft and the information on the temperature and air pressure in the aircraft to the cooking apparatus, and automatically setting the optimum preparation temperature and preparation time as soon as the passengers request for food/beverage preparation. By enabling such automatic food/beverage preparation settings, the workload of the crew member can be reduced.

Embodiment 4

4-1. Problems

The crew members of the aircraft need to fully know about the stored products in storage areas of the galleys and the aircraft in order to take out and supply necessary products in response to requests from passengers.

There are cases where some duty-free items or specific in-flight meals are out of stock due to trends in demands of the passengers.

Moreover, LCCs (low-cost carriers), which have been emerging in recent years, attempt to cut costs by shortening the time between the arrival time and the departure time at an airport, not being able to provide the crew members with enough time to figure out the amount of stock of items stored in each storage area or the places for storing these items. Such a situation brings about a problem in which the crew members need to search various storage areas in response to requests from passengers, creating more time-consuming, burdensome work.

4-2. Configurations and Operations

Figure 9:
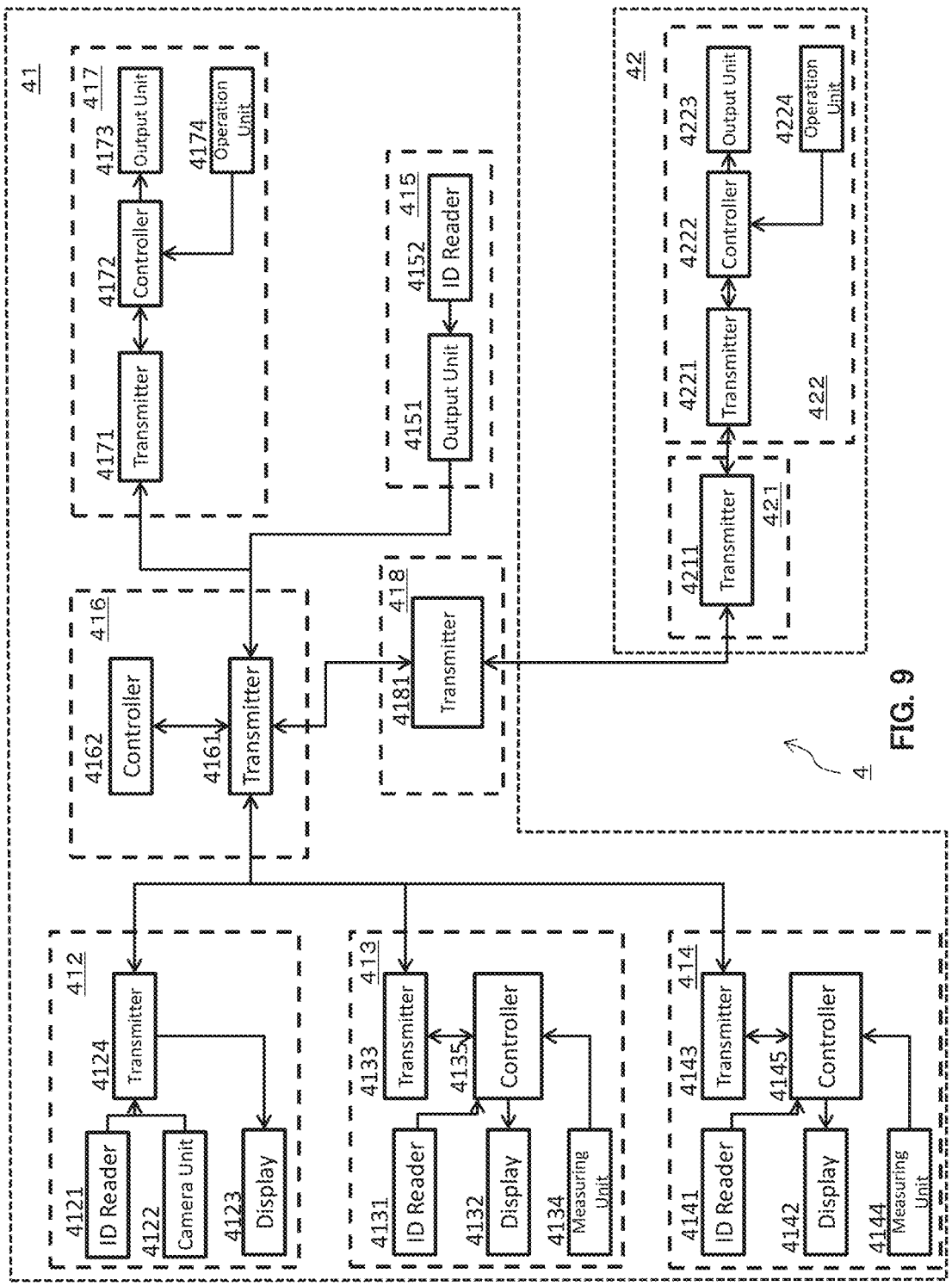
FIG. 9 shows the whole configuration of a system according to Embodiment 4.

As shown in FIG. 9, a cooking control system 4 according to Embodiment 4 comprises a container 412, a stock 413, a cooking tool 414, a server 416, a crew member terminal 417, a trash bin 415, a communication device 418, a communication device 421 that is installed in a monitoring center 42 and includes a communication unit 4211, and a server 422. The container 412, the stock 413, and the cooking tool 414 each are not necessarily a single object and therefore may each be composed of a plurality thereof.

4-2-1. Configuration and Operation of Container 412

The container 412 is a facility installed in, for example, a galley or a corner of the cabin in the aircraft to store supplies such as duty-free items, in-flight meals before preparation, confectionery, and blankets. It can be assumed that a plurality of the containers 412 exist in the aircraft. The containers 412 each have an ID reader 4121 or a camera unit 4122, a display 4123, and a transmitter 4124.

Figure 10:
FIG. 10 shows an example of a stored item having an ID tag used in Embodiment 4.

The ID reader 4121 reads an ID tag 451 written on an article stored in the container 412 (a stored item 45 shown in FIG. 10) and transmits the ID tag 451 to the transmitter. The ID tag 451 may be a two-dimensional bar code such as a bar code or a QR code, a color pattern, an OCR, or an RFID for wirelessly transmitting information.

The camera unit 4122 monitors the presence/absence, amounts, and conditions of the articles stored in the container 412. The camera unit 4122 may have the function of the ID reader 4121 described above. The camera unit 4122 may also be a surveillance camera installed in a ceiling of a galley or the like. For example, the amount of contents or the stored products in a container, which is opened, may be determined from a video captured by the surveillance camera.

The display 4123 is an indicator that is installed in a place recognizable from the outside of the container 412 and is capable of identifying a specific container from the outside of the container. The display 4123 may be the light of an LED or other device capable of displaying pictures and characters, such as an LCD.

The transmitter 4124 is connected to the server 416 via the in-flight network (which may be wired or wireless) and sends and receives various kinds of information.

4-2-2. Configuration and Operation of Stock 413

Now, the stock 413 is, for example, a refrigerator installed in a galley of the aircraft. The stock 413 is a facility for storing supplies such as in-flight meals before preparation, confectionery, and beverages. The stock 413 comprises an ID reader 4131, a display 4132, a measuring unit 4134, a controller 4135, and a transmitter 4133.

The ID reader 4131 reads an ID tag written on an article stored in the stock 413 and transmits the ID tag information to the transmitter.

The display 4132 is an indicator that is installed in a place recognizable from the outside of the stock 413 and is capable of identifying a specific container from the outside of the stock. The display 4132 is also lit up in response to a signal from the controller or the transmitter. The display 4132 may be the light of an LED or other device capable of displaying pictures and characters, such as an LCD.

The transmitter 4133 is connected to the server 416 via the in-flight network (which may be wired or wireless) and sends and receives various kinds of information.

The controller 4135 determines the condition of the stock 413 from the measuring unit 4134 and the like, and in a case where a malfunction of the stock 413 is detected, the controller 4135 notifies the server 416 of the malfunction. In addition, on the basis of the ID information obtained from the ID reader 4131, the controller 4135 sets a storage temperature ideal for a target stored product (item), and in a case where the item is not present in the stock 413, the controller 4135 stops the operation thereof. The target stored products are, for example, duty-free items for in-flight sales, toys for children, blankets, beverages, in-flight meals, or trays for in-flight meal for oven.

4-2-3. Configuration and Operation of Cooking Tool 414

Next, the cooking tool 414 is, for example, an oven, a coffee maker, an microwave oven, or a rice cooker used by the crew member in a galley to heat up an in-flight meal. The cooking tool 414 has an ID reader 4141, a display 4142, a measuring unit 4144, a transmitter 4143, and a controller 4145.

The descriptions of the operations of the ID reader, the display 4142, the measuring unit 4144, and the transmitter 4143 overlap with that of the stock 413 and therefore are omitted accordingly. However, unlike the stock 413, the controller 4145 not only outputs signals associated with malfunctions, but also performs food/beverage preparation in accordance with a heating pattern, such as the preparation temperature, for a stored product (item) such as an in-flight meal.

4-2-4. Configuration and Operation of Server 416

Next, the server 416 is a computer device and comprise a controller 4162 and a transmitter 4161.

The transmitter 4161 is connected to the in-flight network, receives information from each container 412, the stock 413, the cooking tool 414, the trash bin 415, and the crew member terminal 417, and transmits the received information to the controller 4162. The transmitter 4161 also transmits the information to each container 412, the stock 413, the cooking tool 414, and the crew member terminal 417 in response to an instruction from the controller 4162.

On the basis of the information received by the transmitter 4161, the controller 4162 manages the amount of stock of each item and the location thereof and determines the details of processing to be executed on the containers 412 and the crew member terminal 417.

Specifically, when inquired from the crew member terminal 417 about the amount of stock of blankets and the locations of the blankets, the controller 4162 checks the amount of stock in the plurality of containers 412 and notifies the crew member terminal 417 about the amount of stock of blankets and the locations of the blankets. In response to a request from the crew member terminal 417, the controller 4162 lights up the display 4123 of each container 412 having blankets, and visually informs the crew member which ones of the plurality of containers 412 have the requested blankets.

Note that the containers 412 are located in a plurality of places in the aircraft. Thus, on the basis of the location of the crew member terminal 417 or the seat number specified by the crew member terminal 417, the controller 4162 may indicate the closest container and light up the display thereof.

In addition, on the basis of the ID information on packages thrown into the trash bin 415 and the information on a stock remaining in each container 412, the controller 4162 manages what kinds of beverages are currently placed on the tray and served to customers, as well as the number of remaining new products.

The controller 4162 can also communicate with the server of the monitoring center 42 on the ground through the communication device 418, to manage the operational conditions or malfunction conditions of galley devices in the aircraft, prepare replacement galley devices at the arrival location, and prepare duty-free items to be newly loaded by supply of information on the missing duty-free items.

Furthermore, in response to a request from the crew member terminal 417, the controller 4162 can instruct the crew member where to store a target item or which cooking tool to use when preparing food/beverage, by lighting up the indicator of the relevant cooking tool or of the display of the stock.

4-2-5. Configuration and Operation of Crew Member Terminal 417

Next, the crew member terminal 417 is, for example, a terminal installed in a galley and operated by a crew member, and may be a handheld device carried by the crew member, such as a smartphone or a tablet. The crew member terminal 417 has a transmitter 4171, a controller 4172, an output unit 4173, and an operation unit 4174.

The transmitter 4171 is connected to the in-flight network and receives, from the server 416, stock information on an item (e.g., the number of in-flight chicken meals is five), preparation progress information on the cooking tool 414 (food/beverage preparation in progress, food/beverage preparation completed, estimated food/beverage preparation finish time, etc.), item storage location information (e.g., a stock of blankets is located in the container 412 at the front of the aircraft), information on an item preparation/cooking time, and information on an item preparation/cooking procedure (e.g., taking an in-flight meal out of a refrigerator and putting the in-flight meal into the oven, the indicator of which is lit up), and outputs the received information to the output unit 4173.

The controller 4172 converts the formats of these various kinds of information received by the transmitter 4171 into an outputable format, and transmits the resultant information to the output unit 4173.

The output unit 4173 is a display or a speaker and serves to inform the receipt of the information through display or using a sound and display such details as the stock information on an item (e.g., the number of in-flight chicken meals is five), the preparation/cooking information on the cooking tool 414 (food/beverage preparation in progress, food/beverage preparation completed, estimated food/beverage preparation finish time, etc.), the item storage location information (e.g., a stock of blankets is located in the container 412 at the front of the aircraft), and the information on the item preparation procedure (e.g., taking an in-flight meal out of a refrigerator and putting the in-flight meal into the oven as a the cooking tool 414, the indicator of which is lit up). Owing to such configuration, when, for example, the crew member receives a request from a passenger for an in-flight chicken meal, the crew member can immediately see the stock of the in-flight meals remaining in each container and smoothly provide the in-flight meal service to the passenger. In a case where the in-flight meal needs to be cooked, the crew member can also visually check which cooking tool (oven) to use to cook the in-flight meal.

4-2-6. Configuration and Operation of Trash Bin 415

Next, the trash bin 415 is a trash compactor or the like. The trash bin 415 has an output unit 4151 and an ID reader 4152.

The output unit 4151 is connected to the in-flight network and transmits information read by the ID reader to the server 416.

The ID reader 4152 acquires information on discarded products by reading the ID tags of empty packages thrown into the trash bin.

Note that the ID reader 4152 may be a camera, an RFID antenna, a bar code reader, or the like.

4-2-7. Configuration and Operation of Communication Device 418

Next, the communication device 418 is a device that establishes communication between a moving object 41 and the monitoring center 42 on the ground, through satellites by using an antenna or the like.

4-2-8. Configuration and Operation of Server 422

Next, the server 422 is a computer device and comprise a transmitter 4221, a controller 4222, an output unit 4223, and an operation unit 4224.

The transmitter 4221 is connected to an in-flight network of the moving object 41 through the communication device 418, and receives, from the server 416 of the aircraft, information on the stock status of each loaded product, information on the selling situation of duty-free items, information on missing in-flight meals and supplies, and information on malfunctions of cooking tools and the like.

The controller 4222 converts the formats of these various kinds of information received by the transmitter 4221 into an outputable format, and transmits the resultant information to the output unit 4223. The controller 4222 also manages a stock of loaded items, instructs on loading of missing products, and instructs on preparing a replacement for a broken cooking tool.

The output unit 4223 is a display or a speaker and serves to inform the receipt of the information through display or using a sound and display such details as the information on the stock status of each loaded product, the information on the selling situation of duty-free items, the information on missing in-flight meals and supplies, and the information on malfunctions of cooking tools and the like. Such a configuration enables preparation of loaded products in the aircraft scheduled to arrive and preparation of replacements for broken cooking tools prior to the arrival of the aircraft at the arrival airport.

4-3. Effects

By readily checking the locations and stock of loaded products in the aircraft, the labor of the crew members can be reduced, providing a pleasant flight experience to the passengers. Because the crew members can be instructed on how to conduct certain tasks, such as preparing in-flight meals, through use of the present system, the impact of a lack of education and skills of the crew members on the levels of satisfaction of the passengers can be reduced. Further, loading products, replenishing supplies, and replacing broken devices at the arrival location can be arranged in advance by acquiring the information on the aircraft in real time prior to the arrival of the aircraft. Therefore, these tasks can be executed efficiently in a shorter period of time.

Embodiment 5

5-1. Problems

In the galleys of an aircraft, galley inserts (cooking tools in the galleys) are each equipped with a heating tank, wherein water supplied from a tap water tank of the aircraft is heated in each cooking tool and used as hot water. A problem with such configuration is that the energy use efficiency is poor because the water is heated in the small tank inside each individual cooking tool.

On the other hand, calcium and other minerals in the loaded water precipitate and attach to the heater of each cooking tool or to the inside of the conduit of each heater, deteriorating the flow of the water and consequently affecting the water circulation. This brings about the need to replace the heaters on a regular basis, but replacing the heaters of all the cooking tools takes more trouble. Moreover, in some areas to load water, water containing a lot of minerals or unsanitary water that is not purified enough may be loaded, leading to concerns such as passengers not being able to drink safe water without any worry and passengers' stomachs not agreeing with the water, causing upset stomachs. Moreover, the speed of precipitation of minerals increases, causing more frequent replacement of the heaters.

5-2. Configurations and Operations

Figure 11:
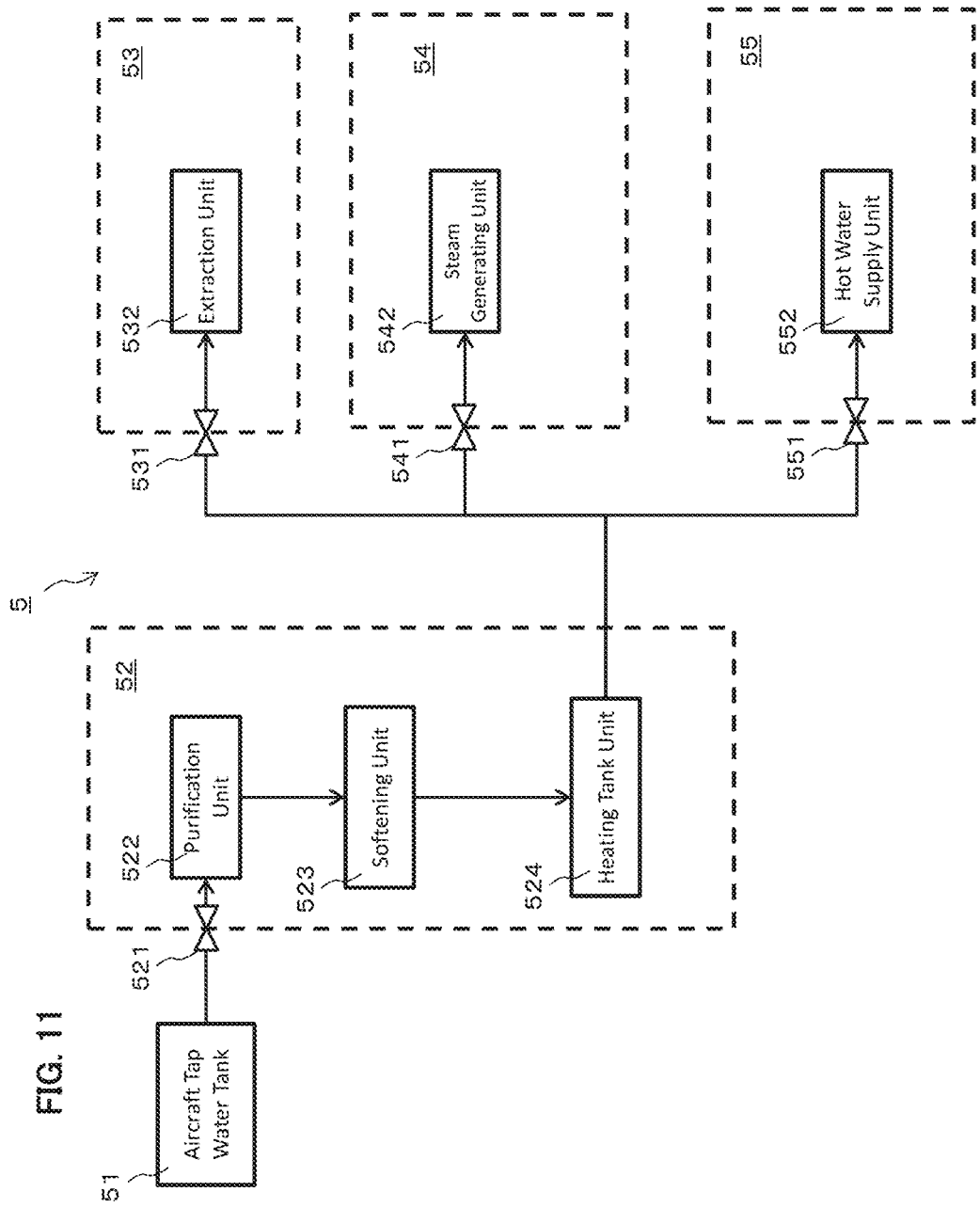
FIG. 11 shows the whole configuration of a system according to Embodiment 5.

As shown in FIG. 11, a cooking control system 5 according to Embodiment 5 is composed by an aircraft tap water tank 51, a purified water heating device 52, and cooking tools 53 to 55. The number of cooking tools 53 to 55 is not limited to three and therefore may be more or even one.

5-2-1. Configuration and Operation of Aircraft Tap Water Tank 51

The aircraft tap water tank 51 is a source tank capable of constantly supplying tap water to the aircraft at a constant pressure.

5-2-2. Configuration and Operation of Purified Water Heating Device 52

The purified water heating device 52 comprises a valve 521, a purification unit 522, a water softening unit 523, and a heating tank unit 524.

The valve 521 is installed in a conduit leading from the aircraft tap water tank 51 to the purification unit 522 and controls introduction and sealing of the tap water.

The purification unit 522 is a device for decomposing fungi, agrochemical residues, toxic substances such as arsenic and chromium, and other organic substances contained in the water. Specifically, examples of this technology include decomposing/detoxifying the toxic substances contained in the water by using, for example, a water purification technique that uses UV and photocatalyst.

The water softening unit 523 is a device for softening the water by removing minerals contained therein, such as calcium and magnesium. Specifically, the water softening unit 523 softens the water using an ion exchange resin or removes the minerals contained in the water by means of ion sequestration or the like.

The heating tank unit 524 is composed by a heater (not shown) for heating the water and a water memory and heats room temperature water and stores the resultant hot water. Note that the tank unit is covered with a heat storage material. If the structure of the heating tank unit is such that the temperature of the heated water is kept high, the efficiency of the tank unit can be further enhanced.

5-2-3. Configuration and Operation of Cooking Tools 53 to 55

Next, the cooking tools 53 to 55 are coffeemakers, ovens, and drinking water supply devices, and each of these cooking tools is now described hereinafter.

The cooking tool 53, which can be, for example, a coffeemaker, is composed of a valve 531 and an extraction unit 532. The valve 531 controls introduction and sealing of the hot water supplied from the heating tank unit 524. Due to the pressure from the tap water tank 51 as described above, the water is supplied automatically to the extraction unit 532 by opening the valves 521 and 531. Although not shown, a pump for supplying hot water may be provided in the middle.

The extraction unit 532 extracts coffee using the hot water supplied from the valve 531. In a case where the temperature is too low to extract coffee, a small-scale heating function may be provided in the coffee maker, which is the cooking tool 53, to heat the water.

The cooking tool 54 is, for example, a steam oven. The cooking tool 54 has a valve 541 and a steam generating unit 542. The function of the valve 541 is the same as that of the cooking tool 53 described above; the description of the valve 541 is omitted accordingly. The steam generating unit 542 is where high-temperature steam is generated for the steam oven. The energy required for heating the water can be optimized by placing hot water in the steam generating unit 542 and heating it instead of creating steam from room temperature water. Moreover, the time it takes to generate steam can be reduced.

The cooking tool 55 is, for example, a drinking water supply device comprising a valve 551 and a hot water supply unit 552, for supplying hot water from a faucet to the crew member. In a case where the hot water is not hot enough, a simple heating device can be provided inside the cooking tool 55 in order to supply hotter water.

5-3. Effects

By integrating the water heating steps executed in the galleys of the aircraft, the energy efficiency of heating water, which has been executed in each cooking tool, can be increased, minimizing the energy consumption. As to replacing the heating tank due to adhesion of minerals, the need to replace the heating tank of each cooking tool can be eliminated and only the integrated heating tank needs to be replaced, making the maintenance work efficient.

On the other hand, adhesion of minerals to the conduits in the aircraft can be prevented by purifying and softening the water. Therefore, not only is it possible to extend the time span to replace the heater, but also safe water can be provided to the passengers regardless of the quality of water obtained at each loading area.

Embodiment 6

6-1. Problems

Embodiment 6 has the same problems as Embodiment 5 in terms of the water heating efficiency and water quality; a large amount of energy is consumed to heat water. Energy consumption in an aircraft affects the fuel economy of the aircraft and therefore needs to be minimized. As to a steam oven, the temperature in the vicinity of the outlet of the steam used for food/beverage preparation increases, bringing about the possibility that the crew member could get burned.

6-2. Configurations

Figure 12:
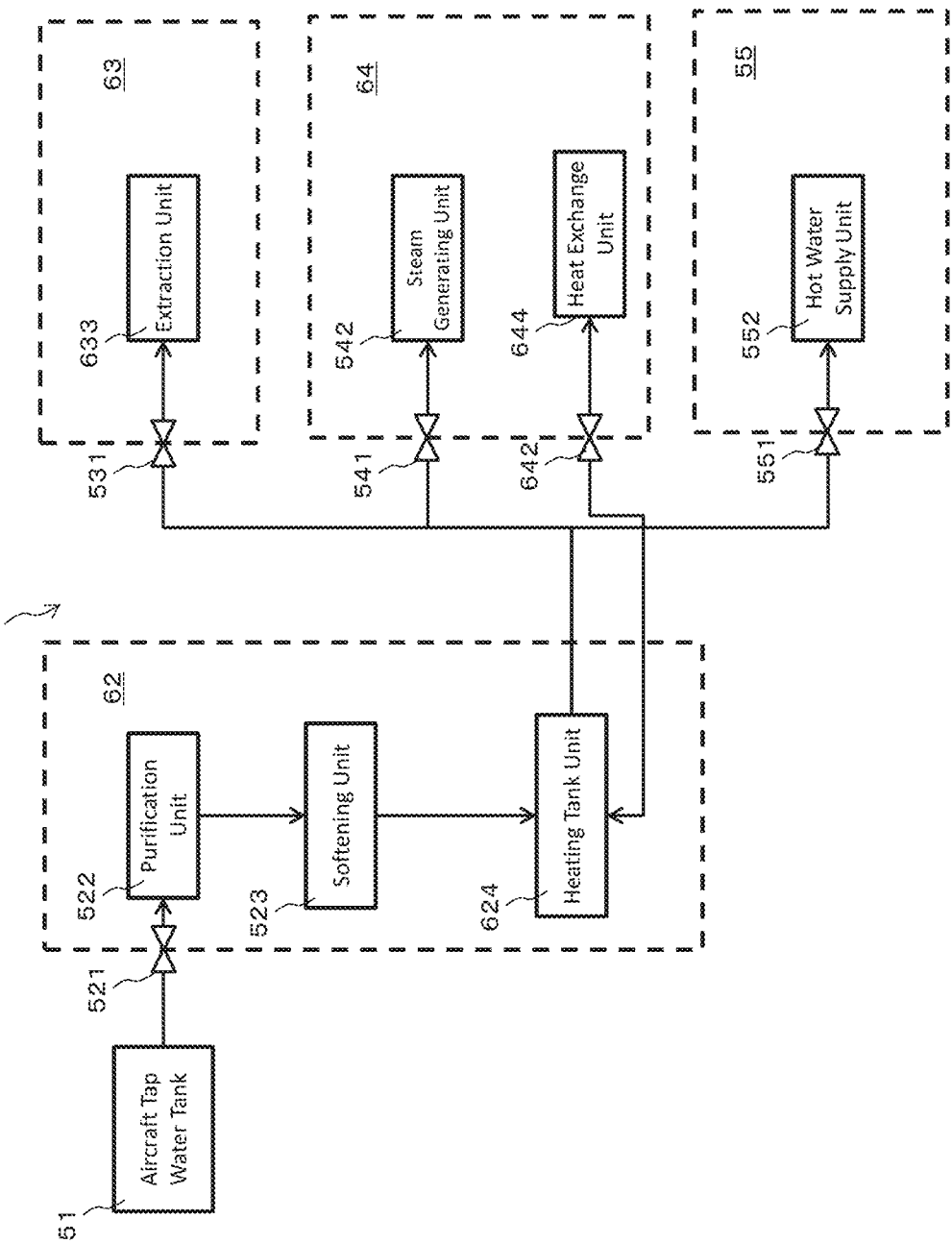
FIG. 12 shows the whole configuration of a system according to Embodiment 6.

In the galley system 6 as shown in FIG. 12, the heating tank unit 624 of the purified water heating device 62 is connected to the heat exchange unit 644 via the valve 642 and a conduit. The heat exchange unit 644 transfers the heat contained in the steam in the steam oven to the water taken out of the heating tank unit 624, to heat the water in the heating tank unit 624.

In this case, the cooking tool 64 can utilize the increase of heat in the steam oven utilizing waste heat of the steam as a steam oven, and/or the increase of heat occurring during trash compaction as a trash compactor.

6-3. Effects

In addition to the effects described in Embodiment 5, the galley system 6 can realize more efficient use of energy.

Embodiment 7

7-1. Problems

In-flight meals provided in an aircraft are prepared by catering companies and therefore only need to be heated up. While dietary preferences vary among passengers, such as a personal preference on how the meat is cooked, the in-flight meals are not tailored to the preferences of the passengers; all the passengers are provided with a one-size-fits-all type of meal service, which is one of the reasons for passenger dissatisfaction.

7-2. Configurations

Figure 13:
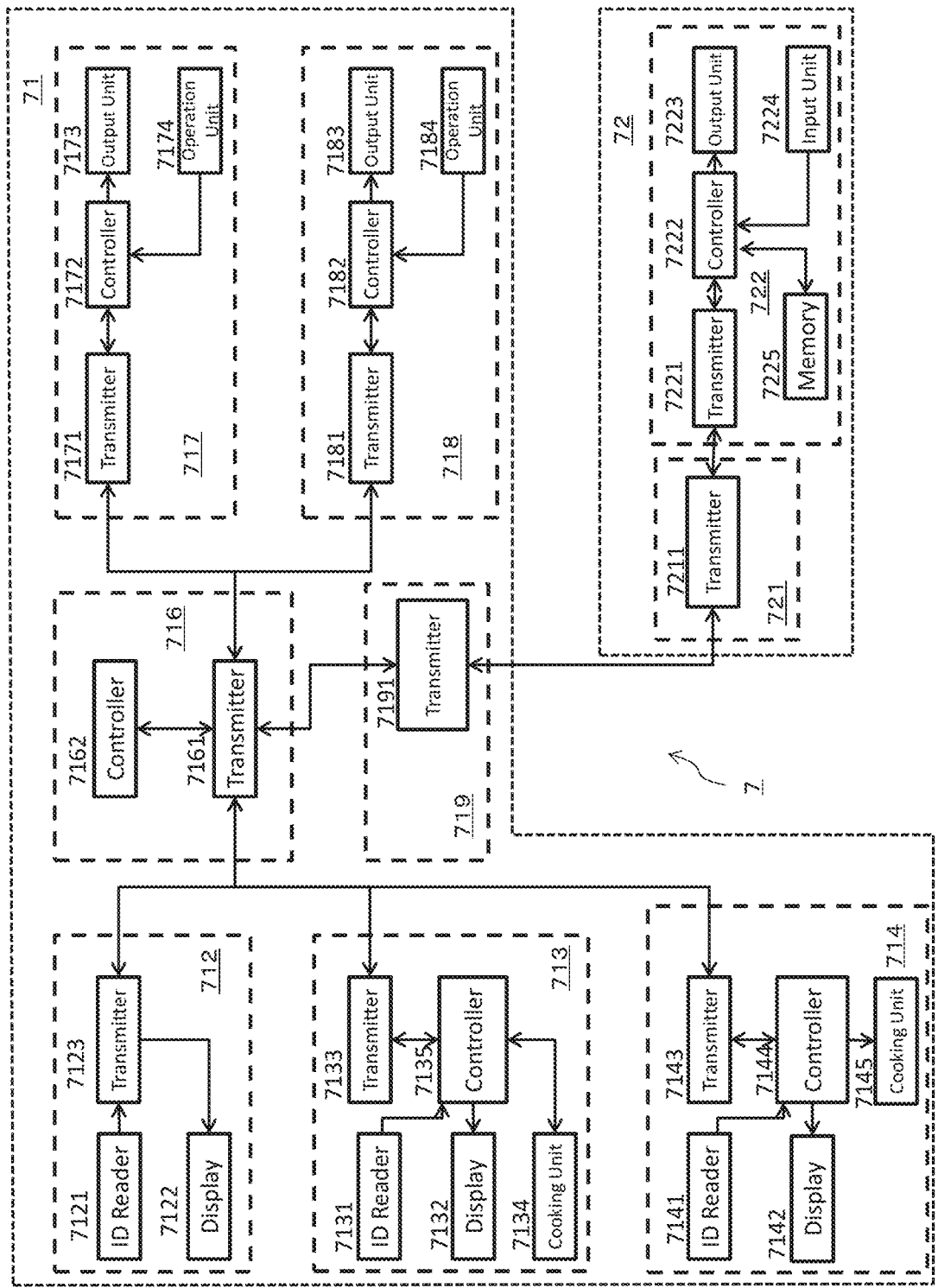
FIG. 13 shows the whole configuration of a system according to Embodiment 7.

As shown in FIG. 13, a galley system 7 according to Embodiment 7 is composed by a container 712, a stock 713, a cooking tool 714, a server 716, a crew member terminal 717, a display device 718, a communication device 719, and a communication device 721 at a monitor center 52, and a server 722. The container 712, the stock 713, and the cooking tool 714 each are not necessarily a single object and therefore may each be composed of a plurality thereof.

7-2-1. Configuration and Operation of Container 712

As with Embodiment 4, the container 712 includes an ID reader 7121. The container 712 lights up the indicator of a display 7122 by operating together with the crew member terminal 717 via the transmitter 7123 for performing food/beverage preparation individually in response to a request from each passenger. This facilitates the crew member preparing food/beverage for each individual passenger.

7-2-2. Configuration and Operation of Stock 713

In substantially the same manner as in Embodiment 4, the stock 713 has a cooking unit 7134 and stores an item at a temperature suitable for the preference tendency of each customer or for the stored item, on the basis of temperature information indicated by the server 716.

Specifically, for a stored item (e.g., ice cream) read by an ID reader 7131, on the basis of information on a corresponding estimated delivery time for a passenger, which is sent from the server 716, a controller 7135 sends an instruction to set the temperature so that the ice cream does not become too hard, the display unit 7132 displays the information, the information is sent and received via the transmitter 7133, and the cooking unit 7134 executes appropriate temperature regulation.

7-2-3. Configuration and Operation of Cooking Tool 714

In substantially the same manner as in Embodiment 4, the cooking tool 714 has a cooking unit 7145 and is capable of selecting and executing an optimum heating pattern on the basis of the information on the preference of the passenger indicated by the server 716 or recipe data corresponding to a target item.

Specifically, an in-flight meal for a specific passenger is read by an ID reader 7141, and how the passenger would like his/her meat cooked (well-done, medium, or the like), which is input by the passenger using the display device 718, is received through the server 716. Then, the in-flight meal can be prepared by the cooking unit 7145 on the basis of a preparation pattern determined by a controller 7144. Alternatively, on the basis of information on an estimated in-flight meal delivery time sent from the server 716, the in-flight meal for the specific passenger can be preheated or the like so that the in-flight meal in perfect condition can be provided to the passenger. The cooking tool 714 further comprises a display 7142 for displaying information and a transmitter 7143 for sending and receiving information with other devices.

7-2-4. Configuration and Operation of Server 716

In substantially the same manner as in Embodiment 4, a controller 7162 determines a heating pattern applied to the cooking tool 714 and a storage temperature pattern applied to the stock 713 and instructs the crew member to prepare food/beverage via the crew member terminal 717, on the basis of information obtained through a transmitter 7161, such as customized request information (personal preference information) on a passenger sent from the display device 718 or the like, recipe data obtained from the data center 72, and flight time information and in-flight meal providing time information obtained from an aircraft system (not shown).

7-2-5. Configuration and Operation of Crew Member Terminal 717

In substantially the same manner as in Embodiment 4, the controller 7172 displays, on an output unit 7173, the information obtained through the transmitter 7171, such as the in-flight meal customized request information on the passenger sent from the display device 718 or the like, the recipe data obtained from the data center 72, and an estimated completion time for food/beverage preparation being currently undertaken using a cooking tool. Furthermore, in accordance with a recipe indicated by the server 716, the controller 7162 displays, on the output unit 7173, instructions for the crew member to take out the target item from the container 712 and place the target item in a specific cooking tool 714. The crew member terminal 717 also includes an operation unit 7174 for receiving an input operation through a touch panel, a button or the like.

7-2-6. Configuration and Operation of Display Device 718

The display device 718 is a computer device such as a monitor for IFE (in-flight entertainment) installed in a seat or a mobile terminal such as a smartphone of a passenger. The display device 718 comprises a transmitter 7181, a controller 7182, an output unit 7183, and an operation unit 7184.

The transmitter 7181 is connected to the server 716 via the in-flight network (which may be wired or wireless) and sends and receives various kinds of information.

The controller 7182 processes information received from the server 716 through the transmitter 7181 and displays the processed information on the output unit 7183, or processes data that are input from the operation unit 7184 and transmits the processed data to the server 716 via the transmitter 7181.

Specifically, the controller 7182 is capable of transmitting, to the server 716, a request regarding how a passenger would like his/her in-flight meal prepared, which is input by the passenger through the operation unit 7184, or displaying, on the output unit 7183, the condition of the in-flight meal of each passenger sent from the server 716 and other information on the in-flight meals.

7-2-7. Configuration and Operation of Server 722

The server 722 is a computer device such as a server installed in the data center 72 and comprises a transmitter 7221, a controller 7222, an output unit 7223, an input unit 7224, and a memory 7225.

The transmitter 7221 of the communication device 721 is connected to the server 716 of a moving object 71 via the transmitter 7211 of the communication device 721 and the transmitter 7191 of the communication device 719, and transmits various kinds of information.

In response to a request from the server 716, the controller 7222 extracts recipe data corresponding to a target in-flight meal and preparation method data thereof from the memory 7225 and transmits these extracted data to the server 716.

At the data center 72, the output unit 7223 outputs the condition of the moving object 71, the recipe data, and the preference of each passenger.

At the data center 72, the input unit 7224 is used to input the recipe data corresponding to each in-flight meal, the preference information on each passenger, and the like.

The memory 7225 is, for example, a database for storing data such as preparation recipe data on various in-flight meals and preference data relating to the doneness of meat or the like preferred by each passenger.

7-3. Effects

Although in-flight meals are undifferentiated and do not reflect the preferences of individual passengers, the galley system 7 allows each passenger to use the display device 718 to enter his/her request, such as how he/she would like his/her in-flight meal heated, enabling preparation or cooking to meet such preferences. The galley system 7 can also support recipes of all kinds of in-flight meals by using the information of the data center 72. For example, the local cuisine from the hometown of a passenger can be reproduced.

7-4 Modified Example

Figure 14:
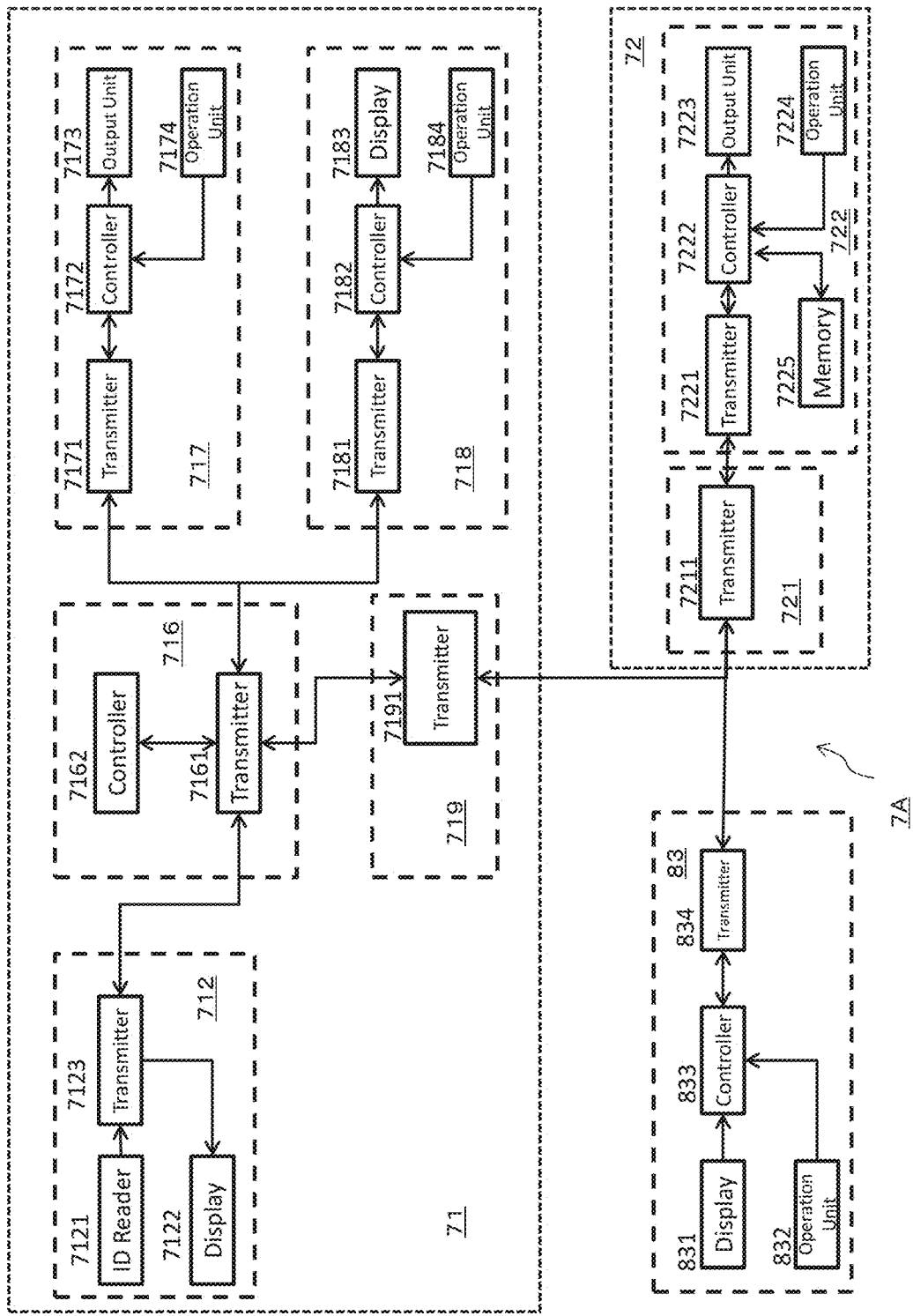
FIG. 14 shows the whole configuration of a system according to a modified example of Embodiment 7.

FIG. 14 shows a galley system 7A according to a modified example of the galley system 7 shown in FIG. 13. The galley system 7A differs from the above embodiment in that it includes a computer terminal 83 such as a user's mobile terminal or a PC communicably connectable to the data center 72.

The computer terminal 83 comprises a display 831 such as a display, a controller 833, a transmitter 834, and an operation unit 832 such as a touch panel, a mouse, and a keyboard. The user is the one who is scheduled to get on the moving body 71 and uses his/her own computer terminal 83 to transmit in advance to the data center user information such as preferences and requests for food/beverages or other services to be provided in the moving object.

The user uses the operation unit 832 and the display 831 to access the data center site and input the user information. The controller 833 transmits the input user information to the communication device 721 of the data center 72 via the transmitter 834. The server 722 of the data center stores the user information in the memory, which is received via the transmitter 721, and transmits the user information in response to the request from the server 716 of the mobile object 71.

Embodiment 8

8-1. Problems

The catering companies produce in-flight meals provided to passengers in an aircraft, according to each flight, and communicate information such as changes in in-flight meals to be loaded, which can be made due to changes of passengers, by means of a private broadcast system or exchanging memorandums. Therefore, the passengers are required to make requests regarding in-flight meals more than 24 hours prior to boarding. For this reason, in many cases, undifferentiated in-flight meal services are provided regardless of the preferences or physical conditions of the passengers. Moreover, although two types of menus of in-flight meals are provided, it is unknown which one of the menus each passenger chooses. For this reason, more in-flight meals than necessary are loaded, leading to poor fuel economy. Also, in order to uniformly provide an extremely large number of in-flight meals, more ingredients need to be purchased.

8-2. Configurations

As shown in FIG. 15, a galley system 8 according to Embodiment 8 is composed by a display device 11 of a passenger on a moving object, a communication device 1121 and a server 1122 of a data center 112, a server 1141, a kitchen terminal 1142, a stock management device 1143 and a cooking apparatus 1144 of a catering company 114, and a container 1112, a server 1113, a communication device 1114 and a crew member terminal 1115 of a moving object 111.

8-2-1. Configuration and Operation of Input Device 110

The display device 110 is a computer terminal such as a personal computer or a smartphone of a passenger. The display device 110 comprises an output unit 1131, an operation unit 1132, a controller 1133, and a transmitter 1134.

The output unit 1131 is a mechanism such as a display, a screen of the smartphone, a speaker outputting sounds or the like, or an indicator outputting light or the like. The operation unit 1132 is a keyboard, a mouse, a touch panel or the like.

The controller 1133 receives information on a request or order made by an input by a passenger using the operation unit 1132 regarding an in-flight meal, his/her preference for food/beverage preparation, or the like and transmits these information to the transmitter 1134.

Now, the transmitter 1134 sends and receives various kinds of information via the communication device 1121 of the data center 117 by using the Internet or the like.

8-2-2. Configuration and Operation of Server 1122

The server 1122 is a computer device such as a server installed in the data center 117 and comprises a transmitter 9221, a controller 9222, an output unit 9223, an operation unit 9224, and a memory 9225.

The controller 9222 receives information on the preference of a customer or an order for an in-flight meal, which is transmitted from the display device 110 via the transmitter 9221, information on a stock quantity of in-flight meals or on the number of in-flight meals remaining in the aircraft, which is transmitted from the moving object 115, and information on the amount of stock of food items or preparation progress information that is transmitted from the catering company 118. The controller 9222 sends, while using data stored in the memory 9225, valid information on in-flight meals to the display device 110, information on the number of food items to the catering company 118, and information on when to prepare food/beverages and the like.

8-2-3. Configuration and Operation of Server 1141

The server 1141 is, for example, a server of the catering company 118 and has a transmitter 11411, a controller 11412, an output unit 11413, an operation unit 11414, and a memory 11415.

By using the Internet or the like (wired or wireless), the transmitter 11411 is connected to the server 1122 via the transmitter 9211 of the communication device 1121 of the data center 117 and to the kitchen terminal 1142, the stock management device 1143, and the galley device 1144 via a network inside the catering company 118 (wired or wireless), and transmits various kinds of information.

The controller 11412 sends various kinds of information (stock information on food items, preparation progress information, status information on each cooking tool) and various instructions (best preparation methods (including temperatures and the like), time required for preparing food/beverages, types and numbers of orders for food items, the amount of food to be loaded into the moving object 115) through the transmitter 11411 to the transmitter 11141 of the communication device 1114 of the moving object 115 of the like. The various kinds of information are input from the kitchen terminal 1142, the stock management device 1143, and the cooking apparatus 1144 via the transmitter 11411. The various instructions are produced based on a request made by a passenger regarding an in-flight meal, travel information on the moving object 115 (not shown), stock information on food items loaded in the moving object 115, and the like.

8-2-4. Configuration and Operation of Kitchen Terminal 1142

The kitchen terminal 1142 is a computer device such as preparation/cooking instruction terminal at a workshop located on the property of the catering company or a handheld terminal of a person in charge of the catering company, and comprises a transmitter 11421, an output unit 11423, and an operation unit 11424.

The transmitter 11421 transmits various kinds of information from the server 1141 to the output unit 11423 and transmits the input from the operation unit 11424 of the kitchen terminal to the server 1141.

The output unit 11423 outputs the information from the server 1141, an instruction to start food/beverage preparation, the status information on each cooking tool, a task instruction for the person in charge of the catering company, and the like. The output unit 11423 may be a display, a monitor of the handheld device, a speaker outputting sounds, an indicator displayed by light, or the like.

An employee of the catering company 118 operates the operation unit 11424 to enter a time required for preparing food/beverages, a food/beverage preparation status, or the amount of stock, and to communicate some sort of trouble.

8-2-5. Configuration and Operation of Stock Management Device 1143

The stock management device 1143 is a device for measuring and managing the amount of stock in a warehouse, and has a transmitter 11431 and a measuring unit 11432.

The measuring unit 11432 is a sensor or a camera of any kind and determines the remaining quantities or types of various stocks in storage areas and transmits the remaining quantities or types of these various stocks to the transmitter 11431.

The transmitter 11431 transmits the information from the measuring unit 11432 to the server 1141.

Although not shown, the stock management device 1143 may have, for example, an automatic ordering function for replenishing a stock, or may have a function for replenishing a stock as needed in response to an instruction from the server 1141.

8-2-6. Configuration and Operation of Galley Device 1144

The galley device 1144 is an oven, a refrigerator, a fryer or the like of the catering company 118. The galley device 1144 comprises a transmitter 11441, a measuring unit 11442, and a controller including a processor which is not shown.

The transmitter 11441 is connected to the network inside the catering company 118 (wired or wireless) and communicates various kinds of information between the measuring unit 11442 or the controller and the server 1141.

For example, in order to make it to loading into the moving object 111 on time, the cooking apparatus 1144 prepares for food/beverage preparation by automatically performing preheating, washing and the like in response to an instruction from the server 1141. Alternatively, responding to trouble can be made simple by transmitting malfunction information on each galley device to the server 1141.

8-2-7. Configuration and Operation of Container 1112

The container 1112 is a storage device provided inside the moving object 115 and is a container in a galley or a memory inside a trolley. The container 1112 has an ID reader 11121, a display 11122, and a transmitter 11123.

The ID reader 11121, the transmitter 11123, and the display 11122 execute the same operations as those described in Embodiment 4, and transmit the amount of stock of in-flight meals loaded in the container 1112 to the server 1113 of the aircraft.

8-2-8. Configuration and Operation of Server 1113

The server 1113 is a computer device installed on the moving object 115 and comprises a transmitter 11131 and a controller 11132.

The transmitter 11131 sends and receives various kinds of information with the server 1122 of the data center 117 on the ground via the communication device 1114 in the moving object 115 and the communication device 1121 in the data center 117. The transmitter 11131 is connected to the network of the moving object 115 including the container 1112 and the crew member terminal 1115 to transmit various kinds of information.

The controller 11132 receives, through the transmitter 11131, information such as information on the amount of stock of in-flight meals loaded in the container of the aircraft, information on the conditions of the in-flight meals, and information on a request made by a customer regarding an in-flight meal, which is sent from the crew member terminal 1115, and transmits the condition of the aircraft to the server 1122 on the ground.

8-2-9. Configuration and Operation of Crew Member Terminal 1115

The crew member terminal 1115 is a computer terminal carried by a crew member in the moving body 115, and comprises an output unit 11151, a controller 11152, a transmitter 11153, and an operation unit 11154. The controller 11152 sends and receives information to and from the container 1112 and the server 1113 in the moving object through the transmitter 11153, outputs the information by the output unit 11151 such as a display or a speaker, and receives instruction information through the operation unit 11154 such as a touch panel or a button receiving an input operation by the crew member.

8-3. Effects

Embodiment 8 allows each passenger to place a last-minute order for an in-flight meal by optimizing the efficiency in preparation and production of in-flight meals, but also enables every passenger to select an in-flight meal or sale of an in-flight meal to each passenger in accordance with the airlines. Embodiment 8 can also achieve optimization of the operations executed in a catering factory, reducing time and costs required for processing in-flight meals.

Moreover, Embodiment 8 can reduce the weight on board and wastes by optimizing the amount of in-flight meals to be loaded into the aircraft, thereby reducing waste of in-flight meals and improving fuel economy.

In addition, in order to prepare, cook and load in-flight meals in response to requests from individual passengers, Embodiment 8 can optimize purchasing of ingredients, thereby realizing reduction of waste loss.

8-4. Modified Example

Embodiment 8 as described above takes an example of the galley system 8 as including the kitchen terminal 1142, the stock management device 1143, and the cooking apparatus 1144, which are installed in the catering company 118, but this is not the only option. It may be a system that connects to only the server 1141 in the catering company 118. In this case, the data including various kinds of information and various instructions stored in the memory 11415 of the server 1141 are transmitted to and from the communication device 1114 of the moving object 1115 or the communication device 1121 of the data center 117.

What is claimed:
1. A cooking control device that is to be installed on a moving object and is configured to communicably connect to a plurality of content display devices and one or more cooking apparatuses, each of the plurality of content display devices configured to playback content on a screen, the cooking control device comprising:
- a processor configured to receive content playback information for the plurality of content display devices respectively, determine one or more of the plurality of content display devices that finish playback of content within a given time based on the content playback information, and produce a preparation/cooking instruction for the one or more cooking apparatuses according to a number of the one or more of the plurality of content display devices; and
- a transmitter configured to transmit the preparation/cooking instruction to the one or more cooking apparatuses.

2. The cooking control device according to claim 1, wherein
the processor is configured to set or change a time length of the given time according to at least one of: a number of the plurality of content display devices, a type of the one or more cooking apparatuses, a subject to be prepared or cooked, or a time for preparing or cooking the subject.

3. The cooking control device according to claim 1, wherein
the processor is configured to
set, for each of the plurality of content display devices, a grace time corresponding to the given time followed by a time when the one or more cooking apparatuses start preparation or cooking based on the content playback information,
determine a first content display device that starts its grace time earliest among the plurality of content display devices,
determine any other content display device that starts its grace time within the given time for the first content display device; and
produce a preparation/cooking instruction for the one or more cooking apparatuses according to the number of the one or more of the plurality of content display devices including the first content display device and the any other content display device.

4. The cooking control device according to claim 3, wherein
the grace time ends at the time when the one or more cooking apparatuses start preparation or cooking.

5. The cooking control device according to claim 1, wherein
the content playback information includes at least one of: a playback position of the content, a playback stop position of the content, a remaining time length of the playback of the content, a time to end the playback of the content, or a time of a scene change.

6. The cooking control device according to claim 1, wherein the preparation/cooking instruction includes at least one of: identification information of the one or more cooking apparatuses, a subject to be prepared or cooked, a preparation/cooking time, or an amount of preparation or cooking.

7. The cooking control device according to claim 1, wherein the processor is configured to change or cancel the preparation/cooking instruction according to at least one of an estimated time of arrival at a destination of the moving object or a forecasted occurrence of turbulence.

8. The cooking control device according to claim 1, wherein
the processor is configured to determine a time when to provide a prepared or cooked subject based on an input signal from outside, cancel the preparation/cooking instruction based on the determination, and produce a new preparation/cooking instruction according to the time when to provide the prepared or cooked subject, and
the transmitter is configured to transmit the new preparation/cooking instruction to the one or more cooking apparatuses.

9. The cooking control device according to claim 1, wherein
the processor is configured to determine that playback or operation of content has been stopped for a certain period of time at any of the plurality of content display devices, and cancel the preparation/cooking instruction based on the determination.

10. The cooking control device according to claim 1, wherein the processor is configured to receive image information including an image of a passenger of the moving object, who uses one of the plurality of content display devices, determine whether the passenger is sleeping based on the image information, and cancel the preparation/cooking instruction based on the determination.

11. A cooking control system comprising:
the cooking control device according to claim 1; and
the plurality of content display devices communicably connectable to the cooking control device, wherein
the plurality of content display devices transmit the content playback information to the cooking control device at regular intervals.

12. The cooking control system according to claim 11, comprising the one or more cooking apparatuses communicably connectable to the cooking control device, wherein the one or more cooking apparatuses perform preparation or cooking based on the preparation/cooking instruction, and transmit to the cooking control device completion information indicating completion of the preparation or the cooking.

13. The cooking control system according to claim 12, comprising a mobile terminal communicably connectable to the cooking control device, wherein the mobile terminal is configured to receive the completion information from the cooking control device and output the completion information.

14. The cooking control system according to claim 11, comprising a plurality of cooking apparatuses, wherein the cooking control device is configured to specify, among from the plurality of cooking apparatuses, a cooking apparatus located closest to one of seats corresponding to the plurality of content display devices, and transmit the preparation/cooking instruction to the specified cooking apparatus.

15. A cooking control method for controlling a plurality of content display devices and one or more cooking apparatuses which are to be installed on a moving object, each of the plurality of content display devices configured to playback content on a screen, the cooking control method including:
receiving content playback information for the plurality of content display devices respectively;
determine one or more of the plurality of content display devices that finish playback of content within a given time based on the content playback information;
produce a preparation/cooking instruction for the one or more cooking apparatuses according to a number of the one or more of the plurality of content display devices;
transmitting the preparation/cooking instruction to the one or more cooking apparatuses; and
causing the one or more cooking apparatuses to perform preparation or cooking according to the preparation/cooking instruction.

* * * * *